US012811157B2

(12) United States Patent
Koga

(10) Patent No.: US 12,811,157 B2
(45) Date of Patent: Nov. 24, 2026

(54) BATTERY AND METHOD FOR PRODUCING BATTERY

(71) Applicant: Panasonic Intellectual Property Management Co., Ltd., Osaka (JP)

(72) Inventor: Eiichi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 713 days.

(21) Appl. No.: 18/333,010

(22) Filed: Jun. 12, 2023

(65) Prior Publication Data

US 2023/0327129 A1 Oct. 12, 2023

Related U.S. Application Data

(63) Continuation of application No. PCT/JP2021/039384, filed on Oct. 26, 2021.

(30) Foreign Application Priority Data

Jan. 8, 2021 (JP) ................................ 2021-002324

(51) Int. Cl.
*H01M 4/66* (2006.01)
*H01M 4/36* (2006.01)
*H01M 10/04* (2006.01)

(52) U.S. Cl.
CPC ........... *H01M 4/661* (2013.01); *H01M 4/366* (2013.01); *H01M 10/0468* (2013.01)

(58) Field of Classification Search
CPC ................................................ H01M 10/0468
See application file for complete search history.

(56) References Cited

U.S. PATENT DOCUMENTS

2015/0318555 A1* 11/2015 Oku ...................... B32B 27/365 429/245
2017/0133712 A1 5/2017 Mimura et al.
(Continued)

FOREIGN PATENT DOCUMENTS

JP 2017-004914 1/2017
JP 2017-157271 9/2017
JP 2018-181451 11/2018

OTHER PUBLICATIONS

The Extended European Search Report (EESR) from the European Patent Office (EPO) dated Aug. 28, 2024 for the related European Patent Application No. 21917561.9.

(Continued)

*Primary Examiner* — Brian R Ohara
(74) *Attorney, Agent, or Firm* — WHDA, LLP

(57) ABSTRACT

A battery production method includes: preparing an electric power generating element including a first current collector containing a first metal, a first active material layer, a solid electrolyte layer, a second active material layer, and a second current collector containing a second metal harder than the first metal which are laminated in this order; and pressing the electric power generating element using a plate-shaped member composed of a first material harder than the first metal and the plate-shaped member having a roughened surface. In the pressing, the electric power generating element is pressed with the roughened surface of the plate-shaped member in contact with a main surface of the first current collector.

9 Claims, 10 Drawing Sheets

(56) References Cited

U.S. PATENT DOCUMENTS

| | | | | |
|---|---|---|---|---|
| 2018/0233771 | A1 * | 8/2018 | Miyazaki ............ | H01M 50/557 |
| 2018/0287209 | A1 | 10/2018 | Hasegawa et al. | |

OTHER PUBLICATIONS

International Search Report of PCT application No. PCT/JP2021/039384 dated Jan. 11, 2022.

* cited by examiner

BATTERY AND METHOD FOR PRODUCING BATTERY

BACKGROUND

1. Technical Field

The present disclosure relates to a battery and a method for producing the battery.

2. Description of the Related Art

A battery composed only of solid materials, i.e., a so-called all-solid-state battery, can be formed by disposing a solid electrolyte layer containing an ion conductive solid electrolyte between a positive electrode active material layer and a negative electrode active material layer and pressing the laminated layers at high pressure. As a technique relating to laminating of all-solid-state batteries, for example, Japanese Unexamined Patent Application Publication No. 2018-181451 discloses a multilayered battery including a plurality of all-solid-state batteries arranged vertically and joined together by pressing. Japanese Unexamined Patent Application Publication No. 2017-157271 discloses a multilayered all-solid-state battery including two all-solid-state batteries that are arranged vertically so as to face each other symmetrically and pressed at high pressure.

SUMMARY

In the conventional techniques, when, for example, an all-solid-state battery is increased in size and/or reduced in thickness, deformation such as warpage may occur in the all-solid-state battery. One non-limiting and exemplary embodiment provides a battery production method that can reduce the deformation.

In one general aspect, the techniques disclosed here feature a battery production method including: preparing an electric power generating element including a first current collector containing a first metal, a first active material layer, a solid electrolyte layer, a second active material layer, and a second current collector containing a second metal harder than the first metal which are laminated in this order; and pressing the electric power generating element using a plate-shaped member composed of a first material harder than the first metal and the plate-shaped member having a roughened surface. In the pressing, the electric power generating element is pressed with the roughened surface of the plate-shaped member in contact with a main surface of the first current collector.

The present disclosure can provide a battery production method that can reduce the deformation.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
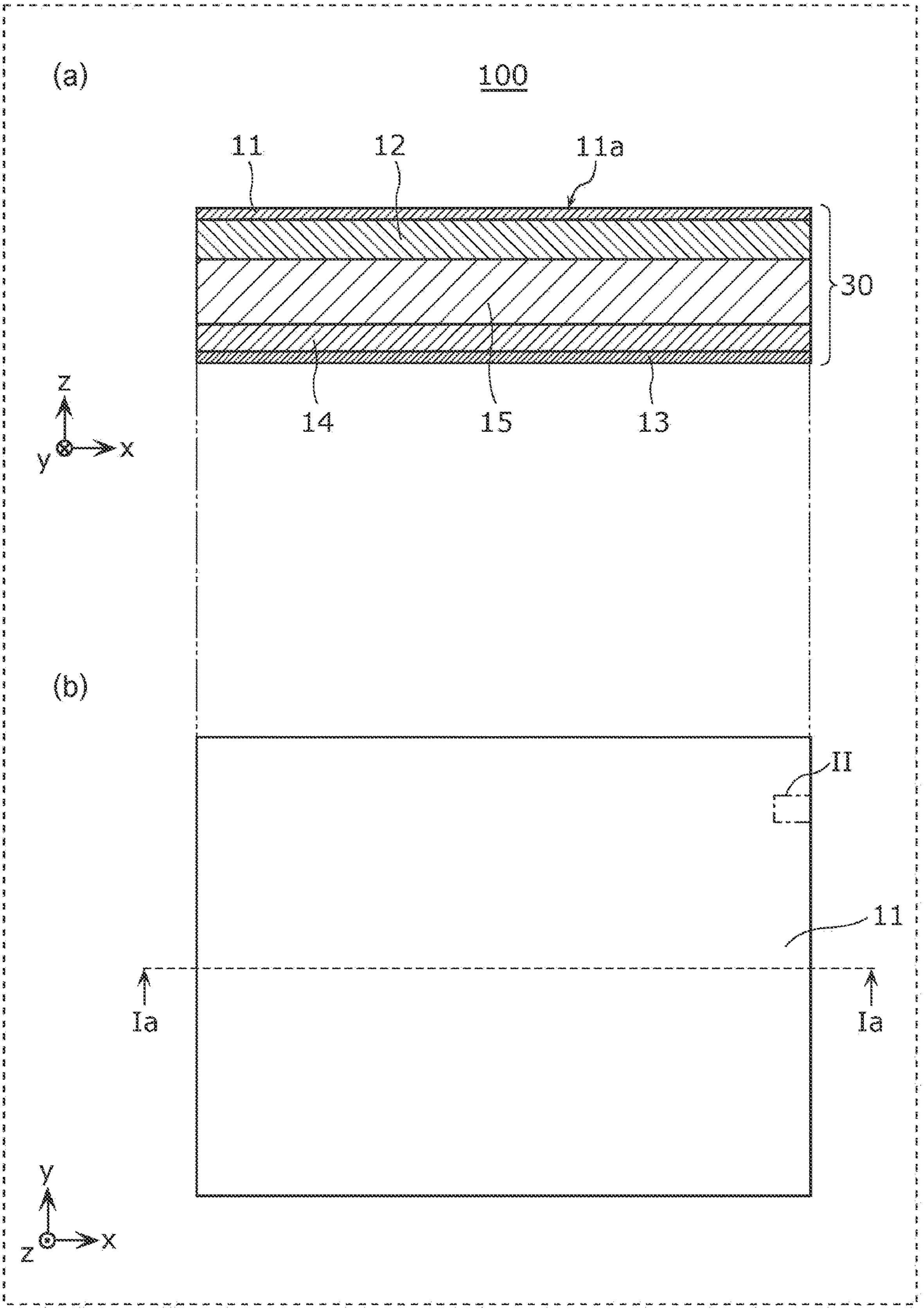
FIG. 1 shows a cross-sectional view and a plan view illustrating a schematic structure of a battery according to an embodiment.

DETAILED DESCRIPTIONS (Overview of the Present Disclosure)

A battery production method according to one aspect of the present disclosure includes the steps of: preparing an electric power generating element including a first current collector containing a first metal, a first active material layer, a solid electrolyte layer, a second active material layer, and a second current collector containing a second metal harder than the first metal which are laminated in this order; and pressing the electric power generating element using a plate-shaped member composed of a first material harder than the first metal and the plate-shaped member having a roughened surface. In the pressing step, the electric power generating element is pressed with the roughened surface of the plate-shaped member in contact with a main surface of the first current collector.

With the above method, deformation of the battery produced can be reduced even when the battery is a large size and/or thin battery. Specifically, during pressing in the pressing step, the roughened surface of the plate-shaped member composed of the first material harder than the first metal bites into the first current collector, and the first current collector is thereby restrained. The first current collector is more susceptible to elongation than the second current collector containing the second metal harder than the first metal. However, by restraining the first current collector in the manner described above, the elongation of the first current collector under the pressure during pressing in the pressing step is suppressed. Therefore, the difference between the elongation of the first current collector and the elongation of the second current collector in the pressing step is small, and the deformation such as warpage of the battery produced can be reduced.

The pressure during the pressing may cause a plurality of protruding portions on the roughened surface of the plate-shaped member composed of the first material to be separated, and the separated protruding portions may remain as adhering objects on a main surface of the first current collector. The presence of the hard adhering objects can reduce the difference between stress in the first current collector and stress in the second current collector that are caused by a change in the temperature of the battery (for example, during thermal cycles). In this manner, in the battery obtained, deformation caused by thermal cycles can be reduced.

For example, in the pressing step, the electric power generating element may be pressed with the roughened surface in contact with the entire main surface of the first current collector.

In this case, since the entire main surface of the first current collector that extends from the outer circumference to the center in plan view is restrained by the plate-shaped member, the effect of suppressing the elongation of the first current collector can be exerted over the entire first current collector. Therefore, the deformation such as warpage of the battery produced can be further reduced.

For example, in the pressing step, the electric power generating element may be pressed with the plate-shaped member in contact with a pressing member.

In this case, the pressing force exerted by the pressing member is directly transmitted to the plate-shaped member, and therefore the restraining force exerted on the first current collector by the plate-shaped member can be increased.

For example, the battery production method may further include, after the pressing step, the step of peeling the plate-shaped member from the electric power generating element.

In this case, the plate-shaped member that does not contribute to the power generation of the battery is removed, and therefore the volumetric energy density of the battery can be increased.

For example, the battery production method may further include, after the pressing step, the step of cutting the electric power generating element.

In this case, an outer circumferential portion of the pressed electric power generating element that is susceptible to distortion, deformation, etc., can be removed, and therefore the battery obtained can have any shape (any capacity) with high shape accuracy while warpage is reduced. When the size of the electric power generating element prepared in the preparing step is increased, a large number of batteries with high shape accuracy can be produced through a series of the above production steps.

For example, the roughened surface may be rougher than the main surface of the first current collector that is brought into contact with the roughened surface.

In this case, the roughened surface of the plate-shaped member can more easily bite into the main surface of the first current collector.

For example, the roughened surface may have a surface roughness Rz larger than or equal to 1 μm and less than or equal to 10 μm.

In this case, the first current collector is prevented from being damaged by the roughened surface of the plate-shaped member in the pressing step, and the plate-shaped member can restrain the first current collector effectively.

For example, the first material may contain a metal.

In this case, even when protruding portions of the plate-shaped member remain on the first current collector, the remaining protruding portions are unlikely to inhibit electrical conduction in the first current collector.

For example, the first material may contain the second metal.

In this case, the difference in hardness between the plate-shaped member and the second current collector is small, and therefore the difference between the elongation of the first current collector restrained by the plate-shaped member and the elongation of the second current collector can be reduced.

For example, the first metal may be aluminum, and the second metal may be copper.

Even when the first current collector and the second current collector contain aluminum and copper, respectively, that are significantly different in hardness as described above, the deformation such as warpage of the battery can be reduced.

For example, the thermal expansion coefficient of the first material may be smaller than the thermal expansion coefficient of the first metal.

In this case, even when the solid electrolyte layer and the active material layers are heated in the pressing step in order to densify these layers, the amount of thermal expansion of the plate-shaped member is smaller than the amount of thermal expansion of the first current collector, and the effect of restraining the first current collector undergoing elongation can be increased.

A battery according to another aspect of the present disclosure includes: an electric power generating element including a first current collector containing a first metal, a first active material layer, a solid electrolyte layer, a second active material layer, and a second current collector containing a second metal harder than the first metal which are laminated in this order; and a plurality of adhering objects that are composed of a first material harder than the first metal and adhere to a main surface of the first current collector that is on an opposite side from the first active material layer.

For example, when the battery is subjected to temperature changes (e.g., thermal cycles), stress is generated in the first current collector and the second current collector that contain different materials. However, in the above structure, the presence of the hard adhering objects adhering to the first current collector can reduce the difference in stress between the first current collector and the second current collector. Therefore, in the battery obtained, deformation such as warpage can be reduced.

For example, the plurality of adhering objects may have an average maximum width less than or equal to 10 μm in plan view.

In this case, even when the battery is subjected to temperature changes such as thermal cycles, the occurrence of structural defects is suppressed because the size of the adhering objects is small.

For example, the first material may contain the second metal.

In this case, for example, the plurality of adhering objects can be caused to adhere to the first current collector using the same material as the material of the second current collector, and therefore the battery can be easily produced.

For example, the main surface of the first current collector to which the plurality of adhering objects adhere may be rougher than a main surface of the second current collector that is on an opposite side from the second active material layer.

In this case, since the main surface of the soft first current collector to which the plurality of adhering objects adhere has an irregular structure and therefore has an increased surface area, the stress due to thermal cycles is dispersed and absorbed and is thereby reduced. Therefore, the occurrence of structural defects and deformation such as warpage of the battery can be reduced, and the thermal shock resistance is improved.

For example, the first metal may be aluminum, and the second metal may be copper.

Even when the first current collector and the second current collector contain aluminum and copper, respectively, that are significantly different in hardness as described above, the deformation such as warpage of the battery can be reduced.

For example, at least one of the plurality of adhering objects may adhere to an edge portion of the first current collector in plan view.

During cutting or polishing of a side wall portion of the first current collector, burrs, which are one of the causes of a short circuit, may be generated. However, in the above case, the side walls of the first current collector are covered with the hard adhering objects, and the occurrence of burrs in the side wall portions is reduced, so that the occurrence of a short circuit of the battery can be reduced.

For example, the first current collector may include at least one step portion formed as a protruding or recessed portion and having a line shape in plan view, and the protruding or recessed portion has a width larger than or equal to 1 mm.

In this case, the step portion divides the flat main surface of the first current collector. Therefore, when stress such as curing stress is generated in a layer in contact with the main surface of the first current collector on which the step portion is formed, the stress is dispersed by the presence of the step portion formed as the protruding or recessed portion and the divided portions of the flat surface and is relaxed. Thus, deformation such as warpage or delamination at the joint portion between the first current collector and the layer in contact with the surface of the first current collector on which the step portion is formed is reduced. Moreover, since the width of the step portion formed as the protruding or recessed portion in plan view is larger than or equal to 1 mm, the stress generated in the layer in contact with the surface of the first current collector on which the step portion is formed is easily dispersed.

For example, the step portion may be formed as the protruding portion, and the number of adhering objects adhering to the first current collector per unit area of the main surface of the first current collector that is on the opposite side from the first active material layer is larger in a portion other than a portion in which the step portion is located than in the portion in which the step portion is located.

In this case, a large number of hard adhering objects are adhering to a thin portion of the first current collector in which the step portion is not formed. Therefore, the adhering objects can effectively relax the stress in the easily deformable thin portion of the first current collector.

For example, the solid electrolyte layer may contain a solid electrolyte having lithium-ion conductivity.

In this case, the battery obtained is a small-size high-capacity battery with deformation reduced.

Next, an embodiment will be described specifically with reference to the drawings.

The embodiment described below shows a general or specific example. Numerical values, shapes, materials, components, and arrangements and connections of the components shown in the following embodiment are merely examples and are not intended to limit the present disclosure. Among the components in the following embodiment, components not described in an independent claim will be described as optional components.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

The drawings are not necessarily strictly accurate illustrations. In the drawings, the same reference numerals are given to substantially the same components, and redundant description thereof will be omitted or simplified.

In the present specification and the drawings, x, y, and z axes are the three axes of a three-dimensional orthogonal coordinate system. In the embodiment, the z axis direction is the direction of the thickness of the battery. In the present specification, "the thickness direction" is a direction perpendicular to the laminating surfaces of the layers. Specifically, the direction in which the layers are laminated is the thickness direction of the layers.

In the present specification, the phrase "in plan view" means that the battery is viewed in its laminating direction. In the present specification, "the thicknesses" of the battery and each layer are their lengths in the laminating direction.

In the present specification, the terms "in" and "out" in "outside," "inside," etc. are "in" and "out" when the battery is viewed in the laminating direction of the battery.

In the present specification, the terms "above" and "below" in the structure of the battery do not refer to an upward direction (vertically above) and a downward direction (vertically below), respectively, in space recognition in an absolute manner but are used to define relative positional relations based on the laminating order in the laminated structure. The terms "above" and "below" are used not only when two components are disposed with a space therebetween and another component is present between the two components but also when two components are disposed in contact with each other.

In the present specification, a "main surface" of a component is its surface perpendicular to the thickness direction of the component.

Embodiment

[Structure of Battery]

First, a battery in an embodiment will be described.

Figure 2A:
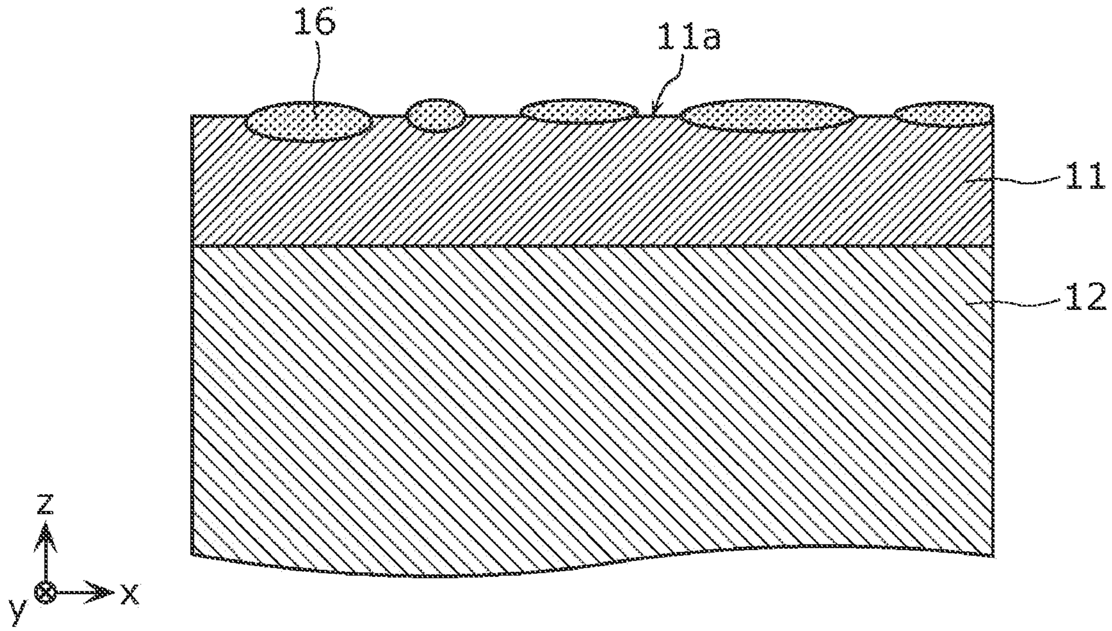
FIG. 2A shows an enlarged cross-sectional view and an enlarged plan view of a positive electrode current collector of the battery according to the embodiment.
Figure 2B:
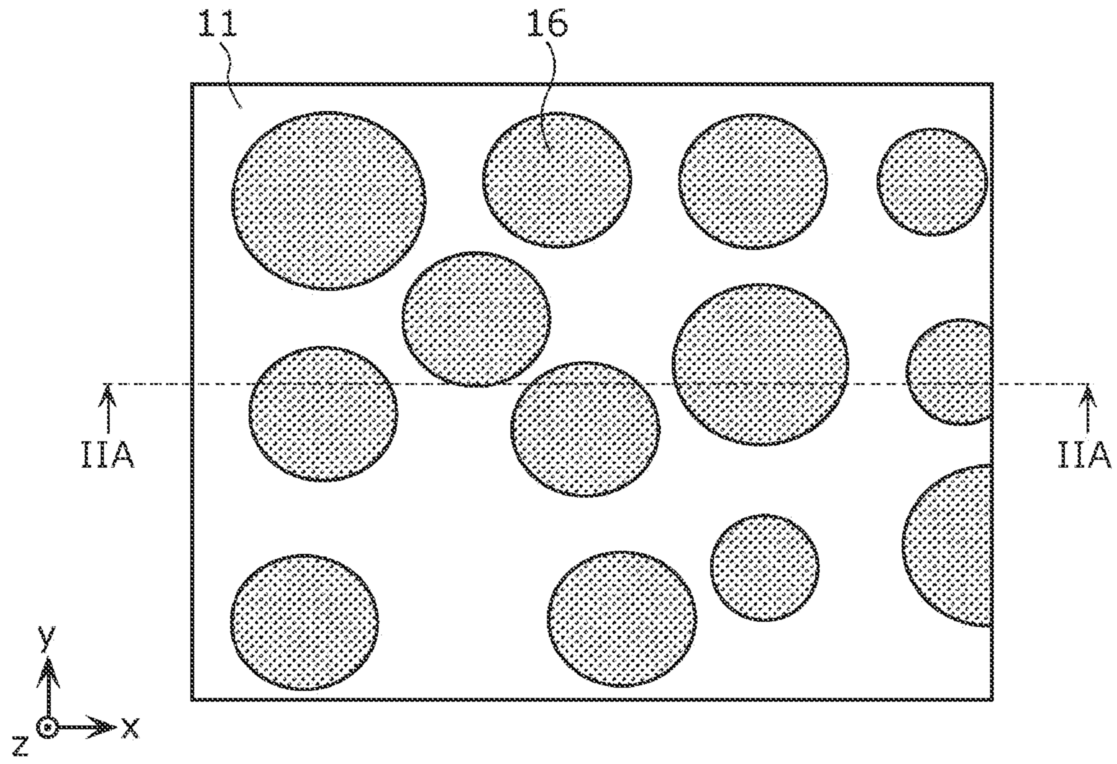
FIG. 2B shows an enlarged cross-sectional view and an enlarged plan view of a positive electrode current collector of the battery according to the embodiment.

FIG. 1 shows a cross-sectional view and a plan view illustrating a schematic structure of the battery according to the present embodiment. Specifically, FIG. 1(*a*) is a cross-sectional view of the battery 100 according to the present embodiment, and FIG. 1(*b*) is a plan view of the battery 100 when it is viewed from above in the z axis direction. The cross section shown in FIG. 1(*a*) is a section taken at a position indicated by line Ia-Ia in FIG. 1(*b*). FIGS. 2A and 2B show an enlarged cross-sectional view and an enlarged plan view of a positive electrode current collector of the battery according to the present embodiment. Specifically, FIG. 2A is an enlarged cross-sectional view of the positive electrode current collector 11, and FIG. 2B is an enlarged plan view of region II in FIG. 1(*b*). The cross section shown in FIG. 2A is a section taken at a position indicated by line IIA-IIA in FIG. 2B.

As shown in FIGS. 1 and 2, the battery 100 has a rectangular parallelepipedic structure with a small thickness. The battery 100 includes; an electric power generating element 30 including the positive electrode current collector 11 containing a first metal, a positive electrode active material layer 12, a solid electrolyte layer 15, a negative electrode active material layer 14, and an electric power generating element 30 containing a second metal harder than the first metal that are laminated in this order; and a plurality of adhering objects 16 composed of a first material harder than the first metal and adhering to a main surface 11*a* of the positive electrode current collector 11 that is on an opposite side from the positive electrode active material layer 12. The positive electrode current collector 11 is an example of the first current collector, and the negative electrode current collector 13 is an example of the second current collector. The positive electrode active material layer 12 is an example of the first active material layer, and the negative electrode active material layer 14 is an example of the second active material layer. In FIG. 1, the illustration of the plurality of adhering objects 16 is omitted because they are small. In FIGS. 2A and 2B, the plurality of adhering objects 16 are shaded with dots for the ease of understanding. However, in reality, the plurality of adhering objects 16 are not shaded with dots. The same applies to the following figures.

The electric power generating element 30 includes, for example, the positive electrode current collector 11, the positive electrode active material layer 12 disposed in contact with the positive electrode current collector 11, the negative electrode current collector 13, the negative electrode active material layer 14 disposed in contact with the negative electrode current collector 13, and the solid electrolyte layer 15 disposed between the positive electrode active material layer 12 and the negative electrode active material layer 14 and containing a solid electrolyte. The positive electrode active material layer 12 and the negative electrode active material layer 14 are disposed between the positive electrode current collector 11 and the negative electrode current collector 13.

The positive electrode current collector 11, the positive electrode active material layer 12, the solid electrolyte layer 15, the negative electrode active material layer 14, and the negative electrode current collector 13 are each, for example, rectangular in plan view. No particular limitation is imposed on the shapes of the positive electrode current collector 11, the positive electrode active material layer 12, the solid electrolyte layer 15, the negative electrode active material layer 14, and the negative electrode current collector 13 in plan view, and they may have shapes other than the rectangular shape such as circular, elliptical, or polygonal shapes.

In the present specification, the positive electrode current collector 11 and the negative electrode current collector 13 may be collectively referred to simply as "current collectors." In the present specification, the positive electrode active material layer 12 and the negative electrode active material layer 14 may be collectively referred to simply as "active material layers."

The positive electrode current collector 11 contains the first metal as a main component and is, for example, composed of the first metal. The negative electrode current collector 13 contains the second metal as a main component and is, for example, composed of the second metal. As for the first metal used for the positive electrode current collector 11 and the second metal used for the negative electrode current collector 13, the second metal may be a metal harder than the first metal. For example, a foil-like member or a plate-like member made of stainless steel, nickel, aluminum, iron, titanium, copper, palladium, gold, platinum, or an alloy composed of two or more of these metals may be used for the current collectors. In the present specification, the hardness is, for example, the Young's modulus. The larger the Young's modulus, the harder. The smaller the Young's modulus, the softer. The Young's modulus of the second metal is, for example, at least 15% larger than the Young's modulus of the first metal and may be at least 30% larger than the Young's modulus of the first metal.

The hardness, e.g., the elastic modulus such as the Young's modulus, of the material of the current collector can be determined in the same manner as in the measurement of the Vickers hardness. Specifically, the elastic modulus is determined by pressing a rigid indenter into the material. Comparison between the relative hardnesses of materials can be made by comparing the sizes of the indentations. The hardness of the material of each current collector can be estimated when the composition of the metal is known. However, by pressing the indenter into different portions of a cross section of the battery with the same force to form indentations, the hardnesses can be compared from the states of the indentations.

In the present embodiment, for example, aluminum is used as the first metal, and copper is used as the second metal. The Young's modulus of aluminum is, for example, about $70\times10^{9}$ Pa, and the thermal expansion coefficient of aluminum is, for example, about $24\times10^{-6}$/K. The Young's modulus of copper is, for example, about $120\times10^{9}$ Pa, and the thermal expansion coefficient of copper is, for example, about $16\times10^{-6}$/K. Even when aluminum and copper that have largely different hardnesses and thermal expansion coefficients are contained in the positive electrode current collector 11 and the negative electrode current collector 13, respectively, deformation such as warpage of the battery 100 can be reduced by using the structure of the battery 100 according to the present embodiment or using a production method described later.

The materials of the current collectors may be appropriately selected such that the materials are not melted and decomposed during the production process and at the temperature and pressure during use and also in consideration of the potentials of the current collectors during the operation of the battery and the electric conductivities of the current collectors. The materials of the current collectors may also be selected according to the required tensile strength and thermal resistance.

The thicknesses of the current collectors are, for example, in the range of more than or equal to 10 μm to less than or equal to 100 μm. Current collectors having thicknesses of less than 10 μm can also be used so long as satisfactory handleability during the production process, characteristics such as the amount of electric current, and reliability are obtained. For example, a general metal foil having a roughened surface is used for each current collector. The surface roughness Rz (the maximum height) of the roughened surface is, for example, more than or equal to 1 μm and less than or equal to 10 μm. When a metal foil having a roughened surface is used as a current collector, the roughened surface is in contact with, for example, an active material layer. In this case, the roughened surface bites into the active material etc. included in the active material layer, and the joint strength between the current collector and the active material layer is increased by the anchor effect.

The plurality of adhering objects 16 are embedded in the main surface 11*a* of the positive electrode current collector 11 that is on the opposite side from the main surface in contact with the positive electrode active material layer 12 and adhere directly to the positive electrode current collector 11. The plurality of adhering objects 16 are each partially exposed at the main surface 11$a$. The main surface 11$a$ of the positive electrode current collector 11 to which the plurality of adhering objects 16 adhere is rougher than, for example, the main surface of the negative electrode current collector 13 that is on the opposite side from the negative electrode active material layer 14. For example, the surface roughness Rz of the main surface of the negative electrode current collector 13 is more than or equal to 0 μm and less than or equal to 0.5 μm, and the surface roughness Rz of the main surface 11$a$ of the positive electrode current collector 11 to which the plurality of adhering objects 16 adhere is more than or equal to 1 μm and less than or equal to 5 μm. On the main surface 11$a$ of the positive electrode current collector 11 to which the plurality of adhering objects 16 adhere, protruding portions are mainly portions in which the plurality of adhering objects 16 stick and adhere directly to the positive electrode current collector 11, and recessed portions are mainly portions in which the positive electrode current collector 11 are exposed.

The plurality of adhering objects 16 are, for example, portions separated from a plate-shaped member 18 composed of the first material and used in the method for producing the battery 100 described later. Therefore, the adhering objects 16 are composed of the first material. The first material contains, for example, a metal as a main component. The first material is composed of, for example, the metal. In this case, the adhering objects 16 are unlikely to inhibit the electrical conduction in the positive electrode current collector 11. Examples of the metal include stainless steel, nickel, aluminum, iron, titanium, copper, palladium, gold, platinum, and alloys of at least two or these metals.

The first material may contain the second metal as a main component and may be composed of the second metal. In this case, for example, the plurality of adhering objects 16 can be caused to adhere to the positive electrode current collector 11 using the same material as the material of the negative electrode current collector 13, and therefore the battery 100 can be produced easily.

The shape of the adhering objects 16 schematically shown in FIGS. 2A and 2B is a circular disk shape, but no particular limitation is imposed on the shape of the adhering objects 16. The adhering objects 16 may have a shape other than the circular disk shape such as a polygonal disk shape, a circular cylindrical shape, a polygonal prism shape, or a gourd shape. The shape of the adhering objects 16 may be an indefinite shape formed from a plurality of curved surfaces or a plurality of flat surfaces.

The average maximum width of the plurality of adhering objects 16 in plan view is, for example, less than or equal to 10 μm. In this case, the size of the adhering objects 16 is small, and, even when the battery 100 is subjected to temperature changes such as thermal cycles, the occurrence of structural defects is reduced. The maximum width in plan view is, for example, the maximum Feret diameter.

The plurality of adhering objects 16 are dispersed on the main surface 11$a$ of the positive electrode current collector 11 so as to form islands. The average or median value of the thicknesses of the plurality of adhering objects 16 is, for example, less than or equal to the surface roughness Rz of the main surface 11$a$ of the positive electrode current collector 11 to which the plurality of adhering objects 16 adhere, e.g., less than or equal to 5 μm. Some of the plurality of adhering objects 16 may overlap each other so as to be continuous with each other.

In the structure described above, the irregular structure originating from the plurality of adhering objects 16 harder than the first metal and adhering as islands to the main surface 11$a$ of the positive electrode current collector 11 formed of the soft first metal can disperse and absorb stress generated in the battery 100 during thermal cycles. The presence of the adhering objects 16 formed of the hard component can reduce the difference between the stress in the positive electrode current collector 11 and the stress in the negative electrode current collector 13 containing the second metal harder than the first metal. This operational effect reduces deformation etc. of the battery 100 and improves its heat shock resistance and thermal cycle resistance.

For example, when an electrically conductive paste is applied to the main surface 11$a$ of the positive electrode current collector 11 to which the plurality of adhering objects 16 adhere, the surface energy is dispersed by the irregular structure of the main surface 11$a$ of the positive electrode current collector 11, and therefore the influence of the surface tension is reduced, so that the wettability of the coating film is improved. This improves the accuracy of the thickness of the coating film and the accuracy of the coating pattern shape. Therefore, the following advantages are obtained when the battery 100 is joined to another battery using, for example, an electrically conductive paste. The joint interface is made uniform, and the coating film is prevented from protruding from the side walls. Moreover, warpage and structural defects due to curing stress are reduced. Therefore, by laminating the batteries 100, a highly reliable laminated battery can be formed.

At least one adhering object 16 of the plurality of adhering objects 16 adheres to, for example, an edge portion of the positive electrode current collector 11 in plan view. When adhering objects 16 harder than the first metal form part of the side walls of the battery 100, the occurrence of burrs, elongation, chips (i.e., metal dust), etc. that are likely to be generated during machining of the soft positive electrode current collector 11 can be reduced, and a short circuit mainly on the side walls is prevented.

The positive electrode active material layer 12 is laminated in contact with one of the main surfaces of the positive electrode current collector 11, i.e., the main surface opposite to the main surface 11$a$ to which the plurality of adhering objects 16 adhere. The positive electrode active material layer 12 contains at least the positive electrode active material. The positive electrode active material layer 12 is a layer composed mainly of a positive electrode material such as a positive electrode active material. The positive electrode active material is a material that allows metal ions such as lithium (Li) ions or magnesium (Mg) ions to be inserted into or removed from its crystal structure at a higher electric potential than that for the negative electrode and is thereby oxidized or reduced. The type of positive electrode active material may be appropriately selected according to the type of battery, and any known positive electrode active material may be used.

The positive electrode active material may be a compound containing lithium and a transition metal element, and examples thereof include an oxide containing lithium and a transition metal and a phosphate compound containing lithium and a transition metal element. Examples of the oxide containing lithium and a transition metal that can be used include lithium-nickel complex oxides such as $LiNi_xM_{1-x}O_2$ (M is at least one element of Co, Al, Mn, V, Cr, Mg, Ca, Ti, Zr, Nb, Mo, and W, and x satisfies $0<x\leq 1$), layered oxides such as lithium cobaltate ($LiCoO_2$), lithium nickelate ($LiNiO_2$), and lithium manganate ($LiMn_2O_4$), and lithium manganates having a spinel structure ($LiMn_2O_4$, $Li_2MnO_3$, and $LiMnO_2$). Examples of the phosphate compound containing lithium and a transition metal that can be used include lithium iron phosphate having an olivine structure ($LiFePO_4$). The positive electrode active material used may be sulfur (S) or a sulfide such as lithium sulfide ($Li_2S$). The positive electrode active material used in this case may be positive electrode active material particles which are coated with, for example, lithium niobate ($LiNbO_3$) or to which lithium niobate ($LiNbO_3$), for example, is added. Only one of these materials may be used as the positive electrode active material, or a combination of two or more may be used.

It is only necessary that the positive electrode active material layer 12 contain at least the positive electrode active material as described above. The positive electrode active material layer 12 may be a mixture layer composed of a mixture of the positive electrode active material and an additional additive material. Examples of the additional additive material that can be used include: solid electrolytes such as inorganic solid electrolytes and sulfide solid electrolytes; conductive aids such as acetylene black; and binders such as polyethylene oxide and polyvinylidene fluoride. When the positive electrode active material layer 12 is formed of a mixture of the positive electrode active material and an additional additive material such as a solid electrolyte at a prescribed ratio, the lithium-ion conductivity in the positive electrode active material layer 12 can be improved, and the election conductivity in the positive electrode active material layer 12 can also be improved. The solid electrolyte used may be, for example, any solid electrolyte exemplified as the solid electrolyte for the solid electrolyte layer 15 described later.

The thickness of the positive electrode active material layer 12 is, for example, more than or equal to 5 μm and less than or equal to 300 μm.

The negative electrode active material layer 14 is laminated in contact with one of the main surfaces of the negative electrode current collector 13, i.e., the main surface of the negative electrode current collector 13 that is on the positive electrode current collector 11 side. The negative electrode active material layer 14 contains at least a negative electrode active material. The negative electrode active material layer 14 is a layer composed mainly of a negative electrode material such as the negative electrode active material. The negative electrode active material is a material that allows metal ions such as lithium (Li) ions or magnesium (Mg) ions to be inserted into or removed from its crystal structure at a lower electric potential than that for the positive electrode and is thereby oxidized or reduced. The type of negative electrode active material may be appropriately selected according to the type of battery, and any known negative electrode active material may be used.

The negative electrode active material used may be a carbon material such as natural graphite, artificial graphite, graphite carbon fibers, or resin heat-treated carbon, or an alloy-based material to be mixed with a solid electrolyte. Examples of the alloy-based material that can be used include: lithium alloys such as LiAl, LiZn, $Li_3Bi$, $Li_3Cd$, $Li_3Sb$, $Li_4Si$, $Li_{4.4}Pb$, $Li_{4.4}Sn$, $Li_{0.17}C$, and $LiC_6$; lithium-transition metal oxides such as lithium titanate ($Li_4Ti_5O_{12}$); and metal oxides such as zinc oxide (ZnO) and silicon oxide (SiOx). The negative electrode active material used may be only one of these material or may be a combination of two or more of these materials.

It is only necessary that the negative electrode active material layer 14 contain at least the negative electrode active material as described above. The negative electrode active material layer 14 may be a mixture layer composed of a mixture of the negative electrode active material and an additional additive material. Examples of the additional additive material that can be used include: solid electrolytes such as inorganic solid electrolytes and sulfide solid electrolytes; conductive aids such as acetylene black; and binders such as polyethylene oxide and polyvinylidene fluoride. When the negative electrode active material layer 14 is formed of a mixture of the negative electrode active material and an additional additive material such as a solid electrolyte at a prescribed ratio, the lithium-ion conductivity in the negative electrode active material layer 14 can be improved, and the election conductivity in the negative electrode active material layer 14 can also be improved. The solid electrolyte used may be, for example, any solid electrolyte exemplified as the solid electrolyte for the solid electrolyte layer 15 described later.

The thickness of the negative electrode active material layer 14 is, for example, more than or equal to 5 μm and less than or equal to 300 μm.

The shapes, positions, and sizes of the positive electrode active material layer 12 and the negative electrode active material layer 14 in plan view are the same. Their sizes and shapes may differ from each other in order to control the capacity ratio between the positive and negative electrodes.

The solid electrolyte layer 15 is disposed between the positive electrode active material layer 12 and the negative electrode active material layer 14 and is in contact with the positive electrode active material layer 12 and the negative electrode active material layer 14.

The solid electrolyte layer 15 contains at least a solid electrolyte. For example, the solid electrolyte layer 15 contains the solid electrolyte as a main component. The solid electrolyte may be any known solid electrolyte for batteries that has no electron conductivity and has ion conductivity. The solid electrolyte used may be, for example, a solid electrolyte that conducts metal ions such as lithium ions or magnesium ions. The type of solid electrolyte may be appropriately selected according to the type of ions to be conducted. The solid electrolyte used may be, for example, an inorganic solid electrolyte such as a sulfide solid electrolyte or an oxide solid electrolyte. Examples of the sulfide solid electrolyte that can be used include lithium-containing sulfides such as $Li_2S—P_2S_5$-based, $Li_2S—SiS_2$-based, $Li_2S—B_2S_3$-based, $Li_2S—GeS_2$-based, $Li_2S—SiS_2—LiI$-based, $Li_2S—SiS_2—Li_3PO_4$-based, $Li_2S—Ge_2S_2$-based, $Li_2SGeS_2—P_2S_5$-based, and $Li_2S—GeS_2—ZnS$-based sulfides. Examples of the oxide solid electrolyte include: lithium-containing metal oxides such as $Li_2O—SiO_2$ and $Li_2O—SiO_2—P_2O_5$; lithium-containing metal nitrides such as $Li_xP_yO_{1-z}N_z$; lithium phosphate ($Li_3PO_4$); and lithium-containing transition metal oxides such as lithium titanium oxide. The solid electrolyte used may be only one of these materials or may be a combination of two or more of these materials.

The solid electrolyte layer 15 may contain, in addition to the solid electrolyte, a binder such as polyethylene oxide or polyvinylidene fluoride.

The thickness of the solid electrolyte layer 15 is, for example, more than or equal to 5 μm and less than or equal to 150 μm.

The material of the solid electrolyte may be aggregates of particles. The material of the solid electrolyte may have a sintered structure.

With the structure of the battery 100 described above, an all-solid-state battery having good performance with the occurrence of deformation such as warpage reduced can be obtained.

[Method for Producing Battery]

Next, an example of the method for producing the battery 100 according to the present embodiment will be described.

Figure 3:
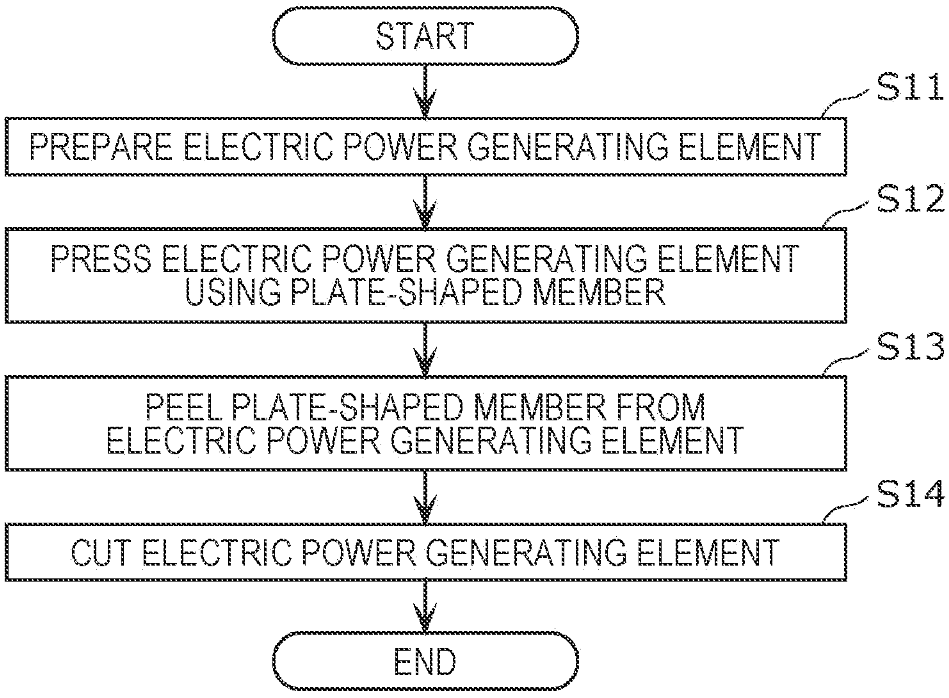
FIG. 3 is a flowchart of a method for producing the battery according to the embodiment.

The method for producing the battery 100 includes, for example, a preparing step, a pressing step, a peeling step, and a cutting step. FIG. 3 is a flowchart of the method for producing the battery 100 according to the present embodiment.

(1) Preparing Step

In the method for producing the battery 100, first, the preparing step is performed. As shown in FIG. 3, in the preparing step, the electric power generating element 30 is prepared which includes the positive electrode current collector 11 containing the first metal, the positive electrode active material layer 12, the solid electrolyte layer 15, the negative electrode active material layer 14, and the negative electrode current collector 13 containing the second metal harder than the first metal that are laminated in this order (step S11).

In the preparing step, for example, the positive electrode current collector 11, the positive electrode active material layer 12, the solid electrolyte layer 15, the negative electrode active material layer 14, and the negative electrode current collector 13 are laminated to form the electric power generating element 30, and the electric power generating element 30 is thereby prepared. Specifically, first, pastes for forming the positive electrode active material layer 12 and the negative electrode active material layer 14 by printing are produced. Solid electrolyte raw materials used for the mixtures prepared for the positive electrode active material layer 12 and the negative electrode active material layer 14 are each, for example, a glass powder of $Li_2S$—$P_2S_5$-based sulfide composed mainly of triclinic crystals and having an average particle diameter of about 10 μm. The glass powder used may be, for example, a glass powder having a high ionic conductivity of about 2 to $3\times10^{-3}$ S/cm. The positive electrode active material used is a powder of Li·Ni·Co·Al complex oxide ($LiNi_{0.8}Co_{0.15}Al_{0.05}O_2$) having a layered structure and an average particle diameter of about 5 μm. A mixture containing the above-described positive electrode active material and the above-described glass powder is dispersed in, for example, an organic solvent to thereby produce a paste for the positive electrode active material layer. The negative electrode active material used is, for example, a natural graphite powder having an average particle diameter of about 10 μm. A mixture containing the above-described negative electrode active material and the above-described glass powder is dispersed in, for example, an organic solvent to thereby produce a paste for the negative electrode active material layer in a manner similar to that described above.

Next, for example, an aluminum foil having a thickness of about 30 μm is prepared as the material used as the positive electrode current collector 11. Then, for example, a copper foil having a thickness of about 30 μm is prepared as the material used as the negative electrode current collector 13. The aluminum foil and the copper foil used are each a foil with at least one of its surfaces roughened. The paste for the positive electrode active material layer and the paste for the negative electrode active material layer are each applied by screen printing to one side of a corresponding foil, e.g., to its roughened surface, to a thickness of more than or equal to 50 μm and less than or equal to 100 μm so as to have a prescribed shape. The paste for the positive electrode active material layer and the paste for the negative electrode active material layer are dried at higher than or equal to 80° C. and lower than or equal to 130° C. so as to have a thickness of more than or equal to 30 μm and less than or equal to 60 μm. In the thus-obtained current collectors, the positive electrode active material layer 12 and the negative electrode active material layer 14 are formed on the respective roughened surfaces. In the following description, the positive electrode current collector 11 with the positive electrode active material layer 12 formed thereon may be referred to as a "positive electrode layer," and the negative electrode current collector 13 with the negative electrode active material layer 14 formed thereon may be referred to as a "negative electrode layer."

Next, a paste for the solid electrolyte layer is produced by dispersing a mixture containing the above-described glass powder of the solid electrolyte raw material in, for example, an organic solvent. The above paste for the solid electrolyte layer is applied by printing to the active material layers of the positive and negative electrode layers using metal masks to a thickness of, for example, about 100 μm. Then the positive and negative electrode layers with the paste for the solid electrolyte layer printed thereon are dried at higher than or equal to 80° C. and lower than or equal to 130° C.

Next, the positive electrode layer and the negative electrode layer are laminated such that the solid electrolyte layer 15 printed on the positive electrode active material layer 12 of the positive electrode layer and the solid electrolyte layer 15 printed on the negative electrode active material layer 14 of the negative electrode layer face each other and are in contact with each other. In this manner, the electric power generating element 30 is formed which includes the positive electrode current collector 11, the positive electrode active material layer 12, the solid electrolyte layer 15, the negative electrode active material layer 14, and the negative electrode current collector 13 that are laminated in this order.

In the preparing step, the electric power generating element 30 may be formed using a method different from the above-described method so long as the electric power generating element 30 prepared includes the positive electrode current collector 11, the positive electrode active material layer 12, the solid electrolyte layer 15, the negative electrode active material layer 14, and the negative electrode current collector 13 that are laminated in this order. For example, the electric power generating element 30 may be formed by laminating the positive electrode current collector 11, the positive electrode active material layer 12, the solid electrolyte layer 15, the negative electrode active material layer 14, and the negative electrode current collector 13 successively in this order.

(2) Pressing Step

Figure 4A:
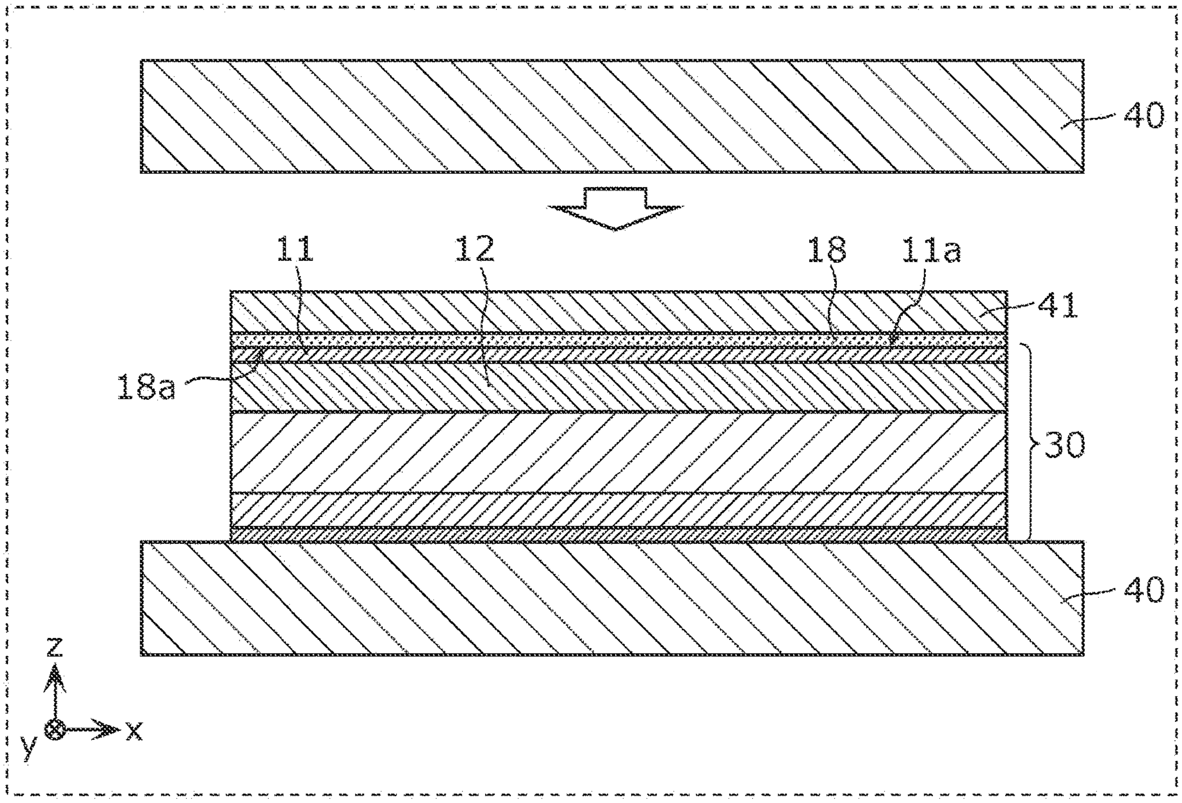
FIG. 4A is a schematic illustration showing a pressing step in the method for producing the battery according to the embodiment.
Figure 4B:
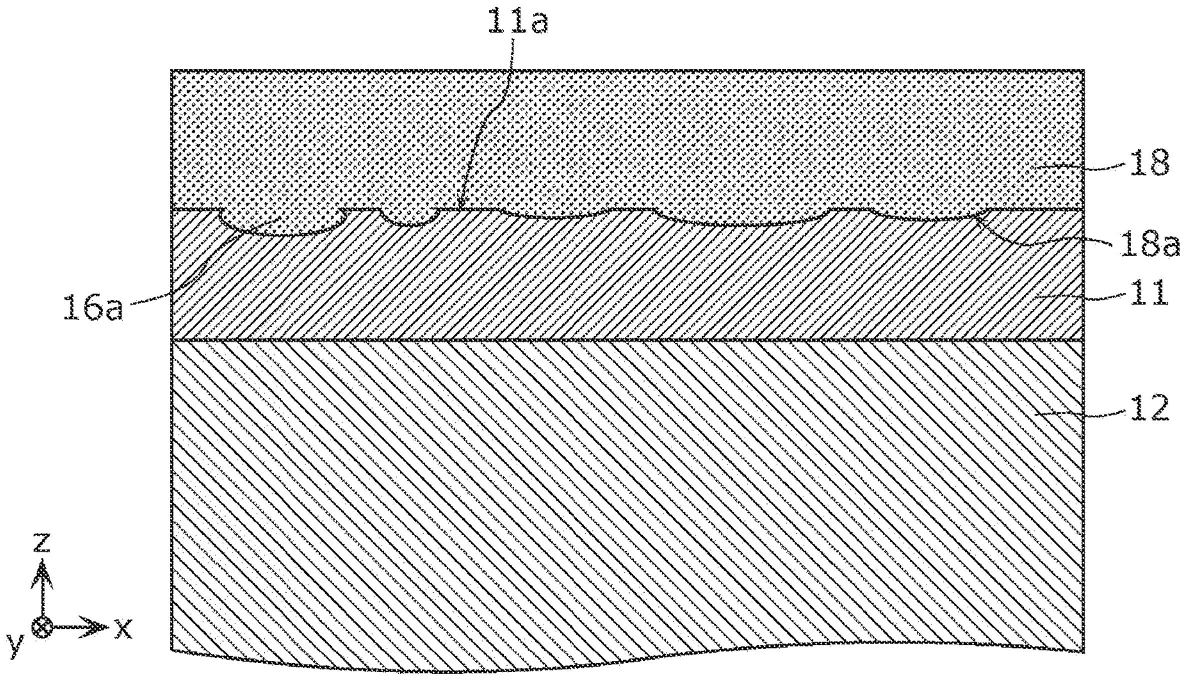
FIG. 4B is a schematic illustration showing a plate-shaped member and the positive electrode current collector at the beginning of pressing in the pressing step in the method for producing the battery according to the embodiment.
Figure 4C:
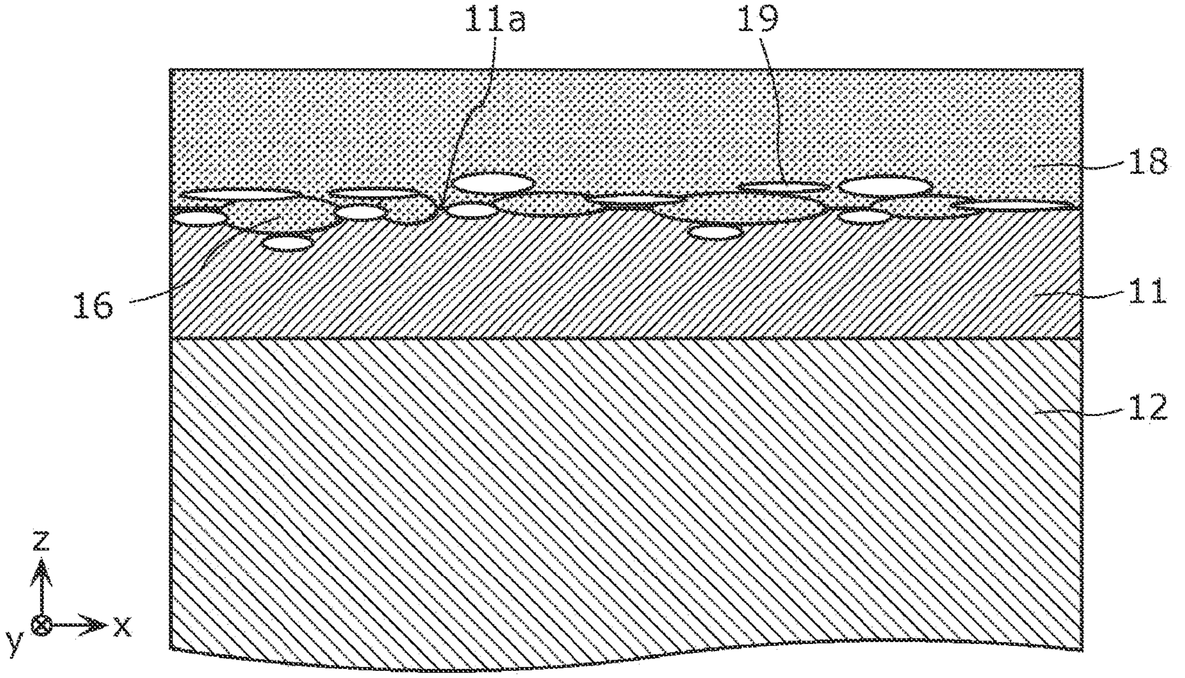
FIG. 4C is a schematic illustration showing the plate-shaped member and the positive electrode current collector after the pressing in the pressing step in the method for producing the battery according to the embodiment.

Next, in the method for producing the battery 100, the pressing step is performed. FIG. 4A is a schematic illustration showing the pressing step in the method for producing the battery 100. FIG. 4A shows the electric power generating element 30 immediately before it is pressed using the plate-shaped member 18. FIG. 4B is a schematic illustration showing the plate-shaped member 18 and the positive electrode current collector 11 at the beginning of pressing in the pressing step in the method for producing the battery 100. FIG. 4C is a schematic illustration showing the plate-shaped member 18 and the positive electrode current collector 11 after the pressing in the pressing step in the method for producing the battery 100. FIGS. 4B and 4C are enlarged cross-sectional views showing the vicinity of the contact interface between the positive electrode current collector 11 and the plate-shaped member 18. As shown in FIGS. 3 and 4A, in the pressing step, the electric power generating element 30 is pressed using the plate-shaped member 18 having a roughened surface 18*a* and composed of the first material harder than the first metal (step S12). In the pressing step, the roughened surface 18*a* of the plate-shaped member 18 is brought into contact with a main surface of the positive electrode current collector 11 to press the electric power generating element 30. In this manner, although the details will be described later, the electric power generating element 30 is pressed with the positive electrode current collector 11 restrained by the plate-shaped member 18.

The plate-shaped member 18 is a metal foil or a metal plate composed of a metal harder than the first metal and having a surface roughened by well-known roughening treatment such as mechanical, physical, electrochemical, or chemical treatment. No particular limitation is imposed on the plate-shaped member 18 so long as it is a member composed of the first material harder than the first metal and having the roughened surface 18*a*. The plate-shaped member 18 may be a relatively thin foil having a thickness of, for example, from about 5 μm to about 100 μm or may be a relatively thick plate having a thickness of, for example, 100 μm or more. The size of the plate-shaped member 18 in plan view is, for example, larger than or equal to the size of the positive electrode current collector 11. Both sides of the plate-shaped member 18 may be roughened. For example, when the surface of the plate-shaped member 18 that is to come into contact with a pressing surface of a pressing member is a roughened surface, friction with the pressing surface during pressing described later is large, and the effect of restraining the positive electrode current collector 11 is further increased.

Specifically, in the pressing step, first, a copper foil having a roughened surface 18*a* is prepared as the plate-shaped member 18 for restraining the positive electrode current collector 11. The copper foil used is, for example, the same copper foil as that used for the negative electrode current collector 13. In this case, the thickness and hardness of the plate-shaped member 18 are the same as those of the negative electrode current collector 13, so that the occurrence of warpage described later can be effectively reduced.

Then, as shown in FIG. 4A, the plate-shaped member 18 is placed on the electric power generating element 30 with the roughened surface 18*a* of the plate-shaped member 18 in contact with the main surface 11*a* of the positive electrode current collector 11 of the electric power generating element 30. In this case, for example, the plate-shaped member 18 is placed on the electric power generating element 30 such that the plate-shaped member 18 covers the entire outer circumference of the positive electrode current collector 11 in plan view. Specifically, the roughened surface 18*a* is brought into contact with the entire main surface 11*a* of the positive electrode current collector 11. In this manner, the plate-shaped member 18 can effectively suppress the outward elongation of the positive electrode current collector 11. The details of the suppression of the elongation of the positive electrode current collector 11 will be described later.

Next, the electric power generating element 30 with the plate-shaped member 18 placed thereon is disposed between upper and lower pressing die plates 40 such that, for example, the plate-shaped member 18 is disposed on the upper side of the electric power generating element 30. Then, for example, an elastic sheet 41 having an elastic modulus of about $5\times10^{6}$ Pa and a thickness of more than or equal to 50 μm and less than or equal to 100 μm is placed on the plate-shaped member 18 such that the elastic sheet 41 is inserted between the plate-shaped member 18 and the upper pressing die plate 40 so as to be in contact with the plate-shaped member 18. The pressing die plates 40 and the elastic sheet 41 are examples of the pressing member. As described above, in the pressing step, the plate-shaped member 18 is pressed so as to come into contact with the elastic sheet 41. The pressing members are members for pressing that are designed specifically for pressing and formed, for example, of materials different from the materials included in the battery 100. Since the plate-shaped member 18 is pressed so as to be in direct contact with the elastic sheet 41, the pressing force is directly transmitted to the plate-shaped member 18.

The elastic sheet 41 may have been subjected to embossing such that the surface roughness Rz of the surface of the elastic sheet 41 that is to be in contact with the plate-shaped member 18 is more than or equal to about 1 μm and less than or equal to about 10 μm. As described above, the surface of the plate-shaped member 18 that is to be in contact with the elastic sheet 41 may have been roughened. When the contact surface of the elastic sheet 41 and the contact surface of the plate-shaped member 18 serving as the restraining member are roughened surfaces, the ease of discharging air from the interface between the elastic sheet 41 and the plate-shaped member 18 is improved. Since the amount of air remaining at the interface between the elastic sheet 41 and the plate-shaped member 18 is reduced, the adhesion between the elastic sheet 41 and the plate-shaped member 18 is increased, so that the restraining effect is enhanced.

Then the upper and lower pressing die plates 40 are used to press the electric power generating element 30 with the plate-shaped member 18 placed thereon for about 90 seconds under heating to, for example, higher than or equal to 50° C. and lower than or equal to 80° C. at a pressure higher than or equal to 300 MPa and lower than or equal to 350 MPa.

In the pressing step described above, when the pressing is started, a plurality of protruding portions 16*a* on the roughened surface 18*a* of the plate-shaped member 18 composed of the first material harder than the first metal bite into the main surface 11*a* of the positive electrode current collector 11, so that the plurality of protruding portions 16*a* are embedded in the positive electrode current collector 11 as shown in FIG. 4B. The positive electrode current collector 11 is softer than the negative electrode current collector 13 and is therefore more likely to be elongated in a direction perpendicular to the thickness direction by the pressing pressure than the negative electrode current collector 13. However, since the plurality of protruding portions 16*a* of the plate-shaped member 18 have bitten into the positive electrode current collector 11, the positive electrode current collector 11 is restrained, and the elongation of the positive electrode current collector 11 is suppressed. Therefore, even when the pressure is released after the pressing, the difference between the elongation of the positive electrode current collector 11 and the elongation of the negative electrode current collector 13 due to the pressing pressure is unlikely to be large. If the difference between the elongation of the positive electrode current collector 11 and the elongation of the negative electrode current collector 13 is large, warpage occurs. However, since the difference is unlikely to be large, the occurrence of warpage is reduced.

When the surface roughness Rz of the roughened surface 18*a* is smaller than, for example, the thickness of the positive electrode current collector 11, the restraining effect obtained is sufficient. When the surface roughness Rz of the surface 18*a* is smaller than the thickness of the positive electrode current collector 11, breakage of the positive electrode current collector 11 during pressing can be prevented. Specifically, the surface roughness Rz of the surface 18*a* is, for example, more than or equal to 1 μm and less than or equal to 10 μm. In this case, breakage of the positive electrode current collector 11 during pressing is prevented, and the plate-shaped member 18 can effectively restrain the positive electrode current collector 11.

The surface 18*a* is rougher than, for example, the main surface 11*a* of the positive electrode current collector 11 that comes into contact with the surface 18*a* in the pressing step. In this case, the protruding portions 16*a* of the plate-shaped member 18 can easily bite into the main surface 11*a* of the positive electrode current collector 11.

In the present embodiment, for example, the thermal expansion coefficient of the first material included in the plate-shaped member 18 is smaller than the thermal expansion coefficient of the first metal. In this case, even when hot pressing is performed, the amount of thermal expansion of the plate-shaped member 18 is smaller than the amount of thermal expansion of the positive electrode current collector 11 containing the first metal, and the effect of restraining the positive electrode current collector 11 by the plate-shaped member 18 can be increased.

The difference between the hardness of the first material and, for example, the hardness of the second metal may be less than or equal to 20%, and the hardness of the first material and the hardness of the second metal may be the same. The hardness is, for example, the Young's modulus. In this case, the difference between the elongation of the plate-shaped member 18 and the elongation of the negative electrode current collector 13 due to the pressing pressure can be reduced. Therefore, the difference between the elongation of the positive electrode current collector 11 restrained by the plate-shaped member 18 and the elongation of the negative electrode current collector 13 can be reduced.

The first material may contain, for example, the second metal and may be composed of the second metal, as described above. In this case, the difference in hardness between the plate-shaped member 18 and the negative electrode current collector 13 is small, and therefore the difference between the elongation of the positive electrode current collector 11 restrained by the plate-shaped member 18 and the elongation of the negative electrode current collector 13 can be reduced.

The difference between the thickness of the plate-shaped member 18 and, for example, the thickness of the negative electrode current collector 13 is less than or equal to 20%, and the thickness of the plate-shaped member 18 may be the same as the thickness of the negative electrode current collector 13. In this case, the difference between the elongation of the plate-shaped member 18 and the elongation of the negative electrode current collector 13 due to the pressing pressure can be reduced. Therefore, the difference between the elongation of the positive electrode current collector 11 restrained by the plate-shaped member 18 and the elongation of the negative electrode current collector 13 can be reduced.

No particular limitation is imposed on the shape of the protruding portions 16*a*, and the protruding portions 16*a* may have any of the shapes exemplified as the shape of the adhering objects 16.

As described above, at the contact interface between the positive electrode current collector 11 and the plate-shaped member 18, the plurality of protruding portions 16*a* of the plate-shaped member 18 bite into the main surface 11*a* of the positive electrode current collector 11 during the pressing. At the end of the pressing, cracks 19 have been formed in portions in which the deformation of the positive electrode current collector 11 or the plate-shaped member 18 has exceeded the ductility limit thereof due to the high pressure during the pressing as shown in FIG. 4C. Specifically, during the pressing, the plate-shaped member 18 suppresses the elongation of the positive electrode current collector 11, and laminar cracks 19 having a width of, for example, from about 0.1 μm to about 3 μm are formed in portions in which deformation has exceeded the ductility limit, as schematically shown in FIG. 4C. The cracks 19 are formed near the contact interface between the positive electrode current collector 11 and the plate-shaped member 18. Generally, the harder the material, the lower the ductility limit. Therefore, the first material is more susceptible to cracking than the first metal (i.e., the positive electrode current collector 11) softer than the first material (i.e., the plate-shaped member 18). Thus, the number of cracks 19 formed and the degree of cracking in the hard plate-shaped member 18 are larger than those in the soft positive electrode current collector 11, and this relation corresponds to the difference in hardness between the positive electrode current collector 11 and the plate-shaped member 18. When the laminar cracks 19 are formed near the surface 18*a* of the plate-shaped member 18, the plurality of protruding portions 16*a* are separated from the plate-shaped member 18 and become a plurality of adhering objects 16 embedded in the positive electrode current collector 11.

(3) Peeling Step

Next, in the method for producing the battery 100, the peeling step is performed. As shown in FIG. 3, in the peeling step after the pressing step, the plate-shaped member 18 is peeled from the electric power generating element 30 pressed in the pressing step (step S13). Specifically, by gently peeling the plate-shaped member 18 off from the electric power generating element 30 from its corner in plan view, the plate-shaped member 18 is separated from the positive electrode current collector 11. By peeling off the plate-shaped member 18 from the corner in a diagonal direction, the plate-shaped member 18 can be removed while the fine cracks 19 shown in FIG. 4C and located near the contact interface between the positive electrode current collector 11 and the plate-shaped member 18 serve as a main peeling surface with no damage to the electric power generating element 30. At the completion of the pressing, the plurality of protruding portions 16*a* of the surface 18*a* of the plate-shaped member 18 have bitten into the main surface 11*a* of the positive electrode current collector 11 and remain as the plurality of adhering objects 16 composed of the first material harder than the first metal, and the plurality of adhering objects 16 stick to the main surface 11*a* of the positive electrode current collector 11. Cracks 19 may remain also near the main surface 11*a* of the positive electrode current collector 11.

The first material may contain, for example, a metal or may be composed of the metal as described above. In this case, even when the protruding portions 16*a* remain as the adhering objects 16 on the positive electrode current collector 11, the electrical conduction of the positive electrode current collector 11 is unlikely to be inhibited.

In the peeling step, the plate-shaped member 18 is peeled off. Since the plate-shaped member 18 that does not contribute to power generation is removed, the volumetric energy density of the battery 100 can be increased.

Through the pressing step and the peeling step as described above, protruding portions formed from the plurality of adhering objects 16 and recessed portions in which the main surface 11*a* of the positive electrode current collector 11 is exposed are formed on the main surface 11*a* of the positive electrode current collector 11 to which the plurality of adhering objects 16 adhere as shown in FIGS. 2A and 2B. A small number of laminar cracks 19 may be contained in the positive electrode current collector 11. However, since structurally weak portions of the positive electrode current collector 11 have been peeled off together with the plate-shaped member 18, high-strength unpeeled portions remain.

(4) Cutting Step

Next, in the method for producing the battery 100, the cutting step is performed. As shown in FIG. 3, in the cutting step after the pressing step, the electric power generating element 30 is cut (step S14). Specifically, in the cutting step, the electric power generating element 30 is heated to higher than or equal to about 50° C. and lower than or equal to 100° C. Then, with the positive electrode current collector 11 facing up, portions around the four outer circumferential edges are vertically cut away from above along the edges using a cutting blade. The battery 100 is thereby obtained. Through the cutting step described above, the outer circumferential portion of the pressed electric power generating element 30 that is susceptible to distortion, deformation, etc. can be removed, and therefore the battery 100 obtained can have any shape with high accuracy while warpage is reduced. When the size of the electric power generating element 30 prepared in the preparing step is increased, a large number of batteries with high shape accuracy can be produced through a series of the above production steps.

In the cutting step, some of the adhering objects 16 are exposed at the side walls of the battery 100 that are cutting surfaces. The exposed adhering objects 16 are, for example, adhering objects 16 cut in the cutting step and may include portions formed as a result of the downward elongation of the adhering objects 16 during cutting.

The irregular structure of the main surface 11*a* of the positive electrode current collector 11 to which the plurality of adhering objects 16 adhere disperses and reduces the difference in thermal expansion stress between the positive electrode current collector 11 and the negative electrode current collector 13. In this case, durability to withstand temperature changes in the electric power generating element 30 is improved, and the occurrence of warpage and structural defects is reduced. Generally, cutting is often performed under heating. Therefore, when an electric power generating element that warps when heated and then cooled is cut, the electric power generating element tends to be broken during cutting. However, with the production method in the present embodiment, the effect of improving the above problem can be obtained. Moreover, since the structure including the hard adhering objects 16 adhering to the upper side of the cutting surfaces, i.e., the main surface 11*a* of the positive electrode current collector 11, is harder than a structure including only the positive electrode current collector 11 containing the soft first metal, the elongation of the positive electrode current collector 11 that occurs along the cutting surfaces is suppressed. In addition, since the amount of chips generated when the elongated portions are removed is reduced, the occurrence of a short circuit is reduced, and the battery 100 obtained can have high reliability.

A plurality of the thus-obtained batteries 100, which are single batteries, may be laminated together, and the resulting battery can be a high-voltage and/or high-capacity laminated battery. The details of the laminated battery will be described later.

The method for forming the battery 100 and the order of the formation are not limited to those in the above example. In the example shown in the production method described above, the paste for the positive electrode active material layer, the paste for the negative electrode active material layer, and the paste for the solid electrolyte layer are applied by printing, but this is not a limitation. Examples of the printing method that can be used include a doctor blade method, a calender method, a spin coating method, a dip coating method, an inkjet method, an offset method, a die coating method, and a spraying method.

In the pressing step described above, the pressing is performed using the pressing die plates 40 after insertion of the elastic sheet 41, but the pressing method is not limited to this method. For example, the electric power generating element 30 and the plate-shaped member 18 may be pressed using the pressing die plates 40 without insertion of the elastic sheet 41 or may be pressed with the elastic sheet 41 attached to the surface of one of the pressing die plates 40. The pressing method is not limited to the flat plate pressing using the pressing die plates 40, and another pressing method such as roll pressing may be used.

At least one of the peeling step and the cutting step may not be performed.

The structure of the battery 100 according to the present embodiment and the method for producing the battery 100 were compared with the structures of the batteries in Japanese Unexamined Patent Application Publication No. 2018-181451 and Japanese Unexamined Patent Application Publication No. 2017-157271 and the methods for producing these batteries, and the following differences were found.

Japanese Unexamined Patent Application Publication No. 2018-181451 discloses a laminated battery including a plurality of all-solid-state batteries arranged vertically and joined together by pressing. In this battery, the surfaces of the current collectors are roughened. In this case, spaces are formed at the joint interface between upper and lower single batteries, and these batteries are connected together while they are partially engaged with each other. This differs from the structure of the battery 100 having the rough irregular surface structure in which the plurality of island-like adhering objects 16 harder than the first metal are caused to adhere to the main surface 11*a* of the positive electrode current collector 11 composed of the first metal. In the battery 100, it is unnecessary that the main surface of the negative electrode current collector 13 that is on an opposite side from the negative electrode active material layer 14 be roughened.

As described above, Japanese Unexamined Patent Application Publication No. 2018-181451 does not disclose the relation between the hardnesses of the current collectors of the battery 100 and the structural characteristics of the main surfaces of the current collectors. Therefore, in Japanese Unexamined Patent Application Publication No. 2018-181451, unlike in the method for producing the battery 100, when each single battery is produced by pressing, the restraining effect of suppressing the elongation of the current collectors during pressing is not obtained. Moreover, unlike the battery 100, the effect of preventing a short circuit and the effect of improving durability during thermal cycles are not obtained. Therefore, with the technique disclosed in Japanese Unexamined Patent Application Publication No. 2018-181451, deformation such as warpage and structural defects are likely to occur in batteries reduced in thickness and/or increased in size, and problems concerning a short circuit and durability during thermal cycles tend to become apparent. It is therefore obvious that, even when single batteries are laminated and pressurized in the manner as in Japanese Unexamined Patent Application Publication No. 2018-181451, the effect of the present embodiment is not obtained.

Japanese Unexamined Patent Application Publication No. 2017-157271 discloses the roughness of a main surface of a current collector that is on an opposite side from an active material layer. However, current collectors with the same polarity are vertically pressed and connected to each other, and the same material is used to form these current collectors. Moreover, there is no description of the structure in which the plurality of hard adhering objects 16 are caused to adhere to the main surface 11*a* of the positive electrode current collector 11. Even when the current collectors composed of a single material are laminated together and pressed, the upper and lower current collectors are simply elongated outward and similarly deformed, and the effect of restraining the current collectors, which is the effect of the method for producing the battery 100 in the present embodiment, is not obtained. Since no hard adhering objects adhere to the current collectors, the effect of preventing a short circuit due to burrs and the effect of improving durability during thermal cycles are not obtained. Moreover, only a parallel connection laminated battery can be obtained.

However, with the battery 100 including the electric power generating element 30 including the positive electrode current collector 11 containing the first metal, the positive electrode active material layer 12, the solid electrolyte layer 15, the negative electrode active material layer 14, and the negative electrode current collector 13 containing the second metal harder than the first metal that are laminated in this order and the plurality of adhering objects 16 composed of the first material harder than the first metal and the method for producing the battery 100, the elongation of the positive electrode current collector 11 during the production of the battery 100 and the occurrence of burrs are reduced, and the durability of the battery 100 during thermal cycles is improved, so that it is obvious that the problems described above do not occur. In Japanese Unexamined Patent Application Publication No. 2018-181451 and Japanese Unexamined Patent Application Publication No. 2017-157271, there is no disclosure and suggestion of the battery 100 including the plurality of adhering objects 16 and the electric power generating element 30 including the positive electrode current collector 11 containing the first metal, the positive electrode active material layer 12, the solid electrolyte layer 15, the negative electrode active material layer 14, and the negative electrode current collector 13 containing the second metal harder than the first metal that are laminated in this order and the method for producing the battery 100.

[Modification 1]

Modification 1 of the embodiment will next be described. In the following description of modification 1, differences from the embodiment will be mainly described, and the description of common features will be omitted or simplified.

Figure 5:
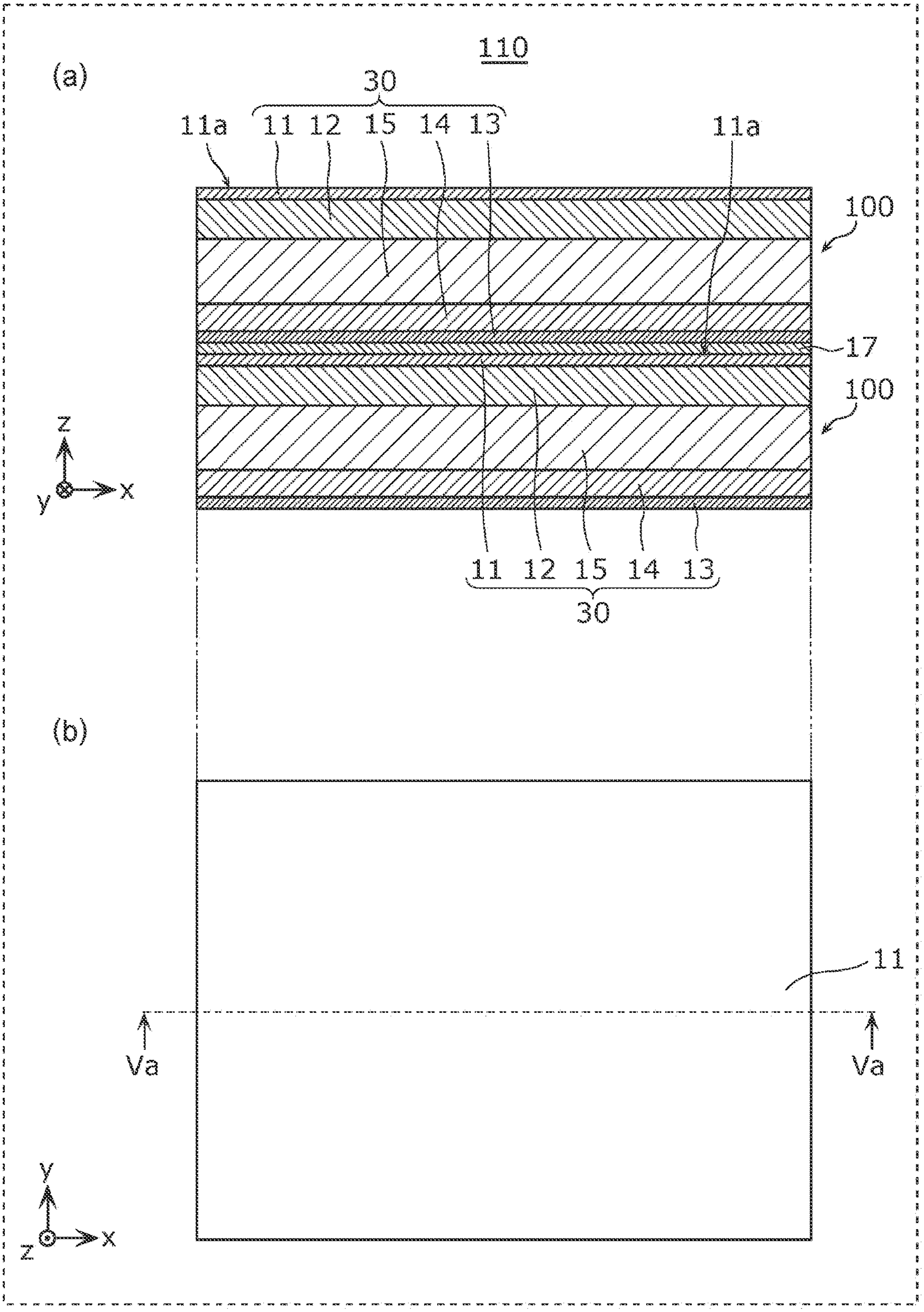
FIG. 5 shows a cross-sectional view and a plan view illustrating a schematic structure of a battery according to modification 1 of the embodiment.

FIG. 5 shows a cross-sectional view and a plan view illustrating a schematic structure of a battery according to modification 1 of the embodiment. Specifically, FIG. 5(*a*) is a cross-sectional view of the battery 110 according to the present embodiment, and FIG. 5(*b*) is a plan view when the battery 110 is viewed from above in the z axis direction. The cross section shown in FIG. 5(*a*) is a section at a position indicated by line Va-Va in FIG. 5(*b*).

As shown in FIG. 5, the battery 110 according to modification 1 of the embodiment differs from the battery 100 in the embodiment in that the electric power generating element 30 is not a single battery but is a laminated battery including a plurality of the batteries 100 serving as single batteries and connected vertically in series. A plurality of adhering objects 16 adhere to the main surface 11*a* of each positive electrode current collector 11, as in the embodiment. However, in FIG. 5, the illustration of the plurality of adhering objects 16 is omitted because they are small. In the present modification, the features of the plurality of adhering objects 16 are the same as those in the embodiment.

The battery 110 includes the plurality of batteries 100 and an electrically conductive connection layer 17 located between adjacent batteries 100 of the plurality of batteries 100. The battery 110 has a structure including the plurality of batteries 100 laminated together. The plurality of batteries 100 are laminated such that the vertical orientations of the batteries 100 are the same. The number of batteries 100 included in the battery 110 is two in the example shown in the figure but may be three or more.

In the batteries 100 vertically adjacent to each other, the main surface 11*a* of the positive electrode, i.e., the positive electrode current collector 11, of the lower battery 100 to which a plurality of adhering objects 16 adhere is electrically connected and fixed to the flat main surface of the negative electrode, i.e., the negative electrode current collector 13, of the upper battery 100 with the connection layer 17 therebetween, and a so-called bipolar electrode structure is formed.

The connection layer 17 that connects the vertically adjacent batteries 100 is formed, for example, of an electrically conductive resin. The material of the connection layer 17 is not limited to the electrically conductive resin so long as the electrical connection between the batteries 100 adjacent to each other and their handling strength can be ensured. The material of the connection layer 17 may be, for example, an electrical conductor such as solder and may be, for example, an electrically conductive tape when the application of the battery only requires somewhat less electric conductivity. The adjacent batteries 100 may be directly connected to each other, for example, by joining or welding without the connection layer 17 interposed therebetween.

When the plurality of batteries 100 are connected in series in the manner described above, the battery 110 obtained is a high-voltage and high-energy laminated battery in which deformation such as warpage can be reduced.

A method for producing the battery 110 will next be described.

To produce the battery 110, first, a plurality of the batteries 100 obtained by the method for producing the batteries 100 according to the embodiment are prepared. Next, a thermosetting electrically conductive paste containing silver particles and serving as an electrically conductive resin is applied by screen printing to the main surface 11*a* of the positive electrode current collector 11 of the lower battery 100 to which a plurality of adhering objects 16 adhere. Specifically, the thermosetting electrically conductive paste is applied to a thickness of about 5 μm to form the connection layer 17. Then the upper battery 100 is placed on the lower battery 100 such that the negative electrode current collector 13 of the upper battery 100 comes into contact with the connection layer 17 so as to establish a series connection, and these batteries 100 are press-bonded together at about 10 $kg/cm^2$. In this case, the irregular structure of the main surface 11*a* of the positive electrode current collector 11 to which the plurality of adhering objects 16 adhere increases the area of contact with the connection layer 17, so that high joint strength is obtained.

When the positive electrode current collector 11 has cracks 19 formed therein, the anchor effect caused by the electrically conductive resin component entering the cracks 19 also contributes to the high joint strength. To increase the number of series connected batteries, the above step is repeated for the number of batteries 100 to be layered. Next, with the upper and lower batteries 100 held under a pressure of, for example, about 1 kg/cm$^2$ so as not to move, the batteries 100 are subjected to thermosetting treatment at higher than or equal to about 100° C. and lower than or equal to about 130° C. for longer than or equal to 40 minutes and shorter than or equal to 100 minutes and then cooled to room temperature. The multilayered battery 110 is thereby obtained. The electrically conductive resin used for the electrically conductive paste may be electrically conductive particles of an electrically conductive resin having a curing temperature suitable for the intended purpose. For example, to form a thin coating film, an electrically conductive resin containing electrically conductive fine particles such as silver fine particles or an electrically conductive resin containing scale-like electrically conductive particles may be used. For the purpose of forming an alloy together with the current collector at the time of heat curing, an electrically conductive resin containing a low-melting point metal may be used.

In the production method described above, the thermosetting electrically conductive paste containing silver metal particles is shown as an example of the conductor paste, but this is not a limitation. The electrically conductive paste used may be a thermosetting electrically conductive paste containing high-melting point high-electrical conductivity metal particles, low-melting point metal particles, and a resin. The melting point of the high-melting point high-electrical conductivity metal particles is, for example, higher than or equal to 400° C. The melting point of the low-melting point metal particles is lower than or equal to the curing temperature of the electrically conductive paste and is, for example, lower than or equal to 300° C. Examples of the material of the high-melting point high-electrical conductivity metal particles include silver, copper, nickel, zinc, aluminum, palladium, gold, platinum, and alloys of combinations of these metals. Examples of the material of the low-melting point metal particles having a melting point lower than or equal to 300° C. include tin, tin-zinc alloys, tin-silver alloys, tin-copper alloys, tin-aluminum alloys, tin-lead alloys, indium, indium-silver alloys, indium-zinc alloys, indium-tin alloys, bismuth, bismuth-silver alloys, bismuth-nickel alloys, bismuth-tin alloys, bismuth-zinc alloys, and bismuth-lead alloys. When the electrically conductive paste containing the above low-melting point metal particles is used, solid phase and liquid phase reactions proceed in portions in which the metal particles in the electrically conductive paste and the metal forming the current collector are in contact with each other even at a curing temperature lower than the melting point of the high-melting point high-electrical conductivity metal particles. In this case, diffusion regions alloyed by the solid phase and liquid phase reactions are formed at the interface between the electrically conductive paste and the main surface of the current collector so as to be located near the contact portions. Examples of the alloy formed include highly electrically conductive alloys such as silver-copper-based alloys when silver or a silver alloy is used for the electrically conductive metal particles and copper is used for the current collector. A silver-nickel alloy, a silver-palladium alloy, etc. may be formed depending on the combination of the electrically conductive metal particles and the current collector. With the above structure, the electrically conductive paste and the current collector are more firmly jointed together. For example, the operational effect of preventing the joint portion between the connection layer 17 and the current collector from separating from each other due to thermal cycles or an impact can be obtained.

The high-melting point high-electrical conductivity metal particles and the low-melting point metal particles may have any shape such as a spherical shape, a scale shape, or a needle shape. No particular limitation is imposed on the particle size of the high-melting point high-electrical conductivity metal particles and the particle size of the low-melting point metal particles. For example, the smaller the particle size, the lower the temperature at which the alloying reaction and diffusion can proceed. Therefore, the size and shape of the particles are appropriately selected in consideration of process design and the influence of thermal history on battery characteristics.

Any resin may be used for the thermosetting electrically conductive paste so long as the resin functions as a binder, and the resin is appropriately selected according to the production process used such as printability and coatability. The resin used for the thermosetting electrically conductive paste contains, for example, a thermosetting resin. Examples of the thermosetting resin include: (i) amino resins such as urea resins, melamine resins, and guanamine resins; (ii) epoxy resins such as bisphenol A-type epoxy resins, bisphenol F-type epoxy resins, phenol novolac-type epoxy resins, and alicyclic epoxy resins; (iii) oxetane resins; (iv) phenolic resins such as resol-type phenolic resins and novolac-type phenolic resins; and (v) silicone-modified organic resins such as silicone epoxy and silicone polyester. The resin used may be only one of these materials or a combination of two or more of these materials.

[Modification 2]

Modification 2 of the embodiment will next be described. In the following description of modification 2, differences from the embodiment and modification 1 of the embodiment will be mainly described, and the description of common features will be omitted or simplified.

Figure 6:
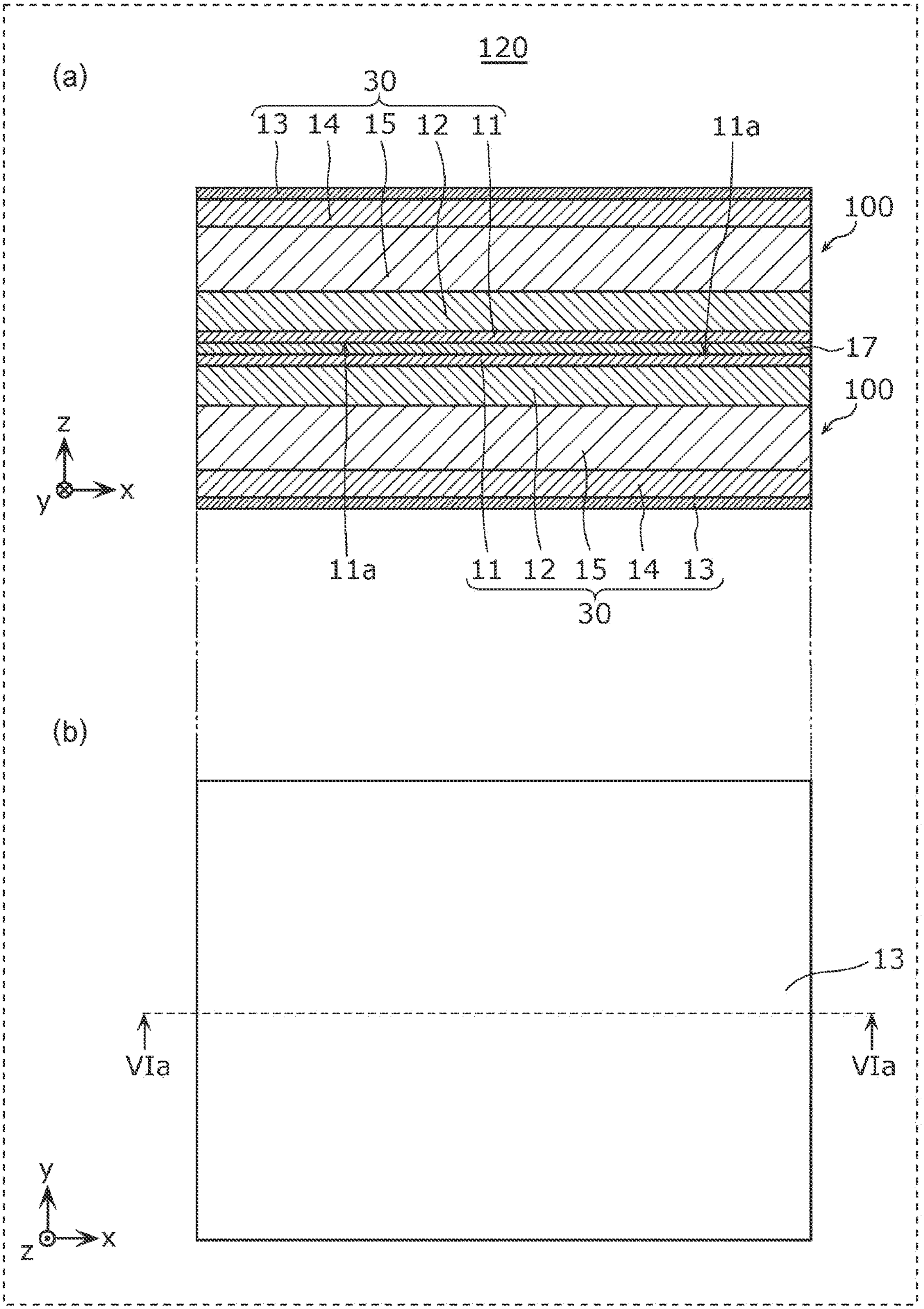
FIG. 6 shows a cross-sectional view and a plan view illustrating a schematic structure of a battery according to modification 2 of the embodiment.

FIG. 6 shows a cross-sectional view and a plan view illustrating a schematic structure of a battery according to modification 2 of the embodiment. Specifically, FIG. 6(*a*) is a cross-sectional view of the battery 120 according to the present embodiment, and FIG. 6(*b*) is a plan view when the battery 120 is viewed from above in the z axis direction. The cross section shown in FIG. 6(*a*) is a section at a position indicated by line VIa-VIa in FIG. 6(*b*).

As shown in FIG. 6, the battery 120 according to modification 2 of the embodiment differs from the battery 110 in modification 1 in that the upper battery 100 is reversed in orientation. In this case, in the battery 120, the plurality of batteries 100 are connected such that electrodes with the same polarity, i.e., the positive electrodes in the example in FIG. 6, face each other, and the battery formed is a parallel connection laminated battery. A plurality of adhering objects 16 adhere to the main surface 11*a* of each positive electrode current collector 11, as in the embodiment. However, in FIG. 6, the illustration of the plurality of adhering objects 16 is omitted because they are small. In the present modification also, the features of the plurality of adhering objects 16 are the same as those in the embodiment.

The battery 120 includes the plurality of batteries 100 and an electrically conductive connection layer 17 located between adjacent batteries 100 of the plurality of batteries 100. The battery 120 has a structure including the plurality of batteries 100 laminated together. The plurality of batteries 100 are laminated such that the vertical orientations of the batteries 100 are reversed alternately. The number of batteries 100 included in the battery 120 is two in the example shown in the figure but may be three or more.

In the batteries 100 vertically adjacent to each other, the main surfaces 11*a* of their positive electrode current collectors 11 to which the plurality of adhering objects 16 adhere are electrically connected and fixed to each other with the connection layer 17 therebetween.

When the batteries 100 vertically adjacent to each other and facing each other have the same polarity as described above, parallel connection can be established. For example, to install a positive electrode, a conductor, e.g., an output lead such as the copper or aluminum foil used for the current collector, is inserted into the connection interface between the vertically adjacent batteries 100. Alternatively, an output lead terminal formed as a part of one of the current collectors in an external region of the batteries 100 may be used.

In the above structure, the plurality of batteries 100 are connected in parallel, and the battery 120 obtained is a high-capacity laminated battery in which the occurrence of deformation such as warpage can be reduced.

The battery 120 can be produced by the same method as the method for producing the battery 110 except that the orientations of the plurality of batteries 100 laminated are changed such that a parallel connection is obtained.

The negative electrode current collectors 13 of vertically adjacent batteries 100 may be connected to each other with a connection layer 17 interposed therebetween.

[Modification 3]

Modification 3 of the embodiment will next be described. In the following description of modification 3, differences from the embodiment will be mainly described, and the description of common features will be omitted or simplified.

Figure 7:
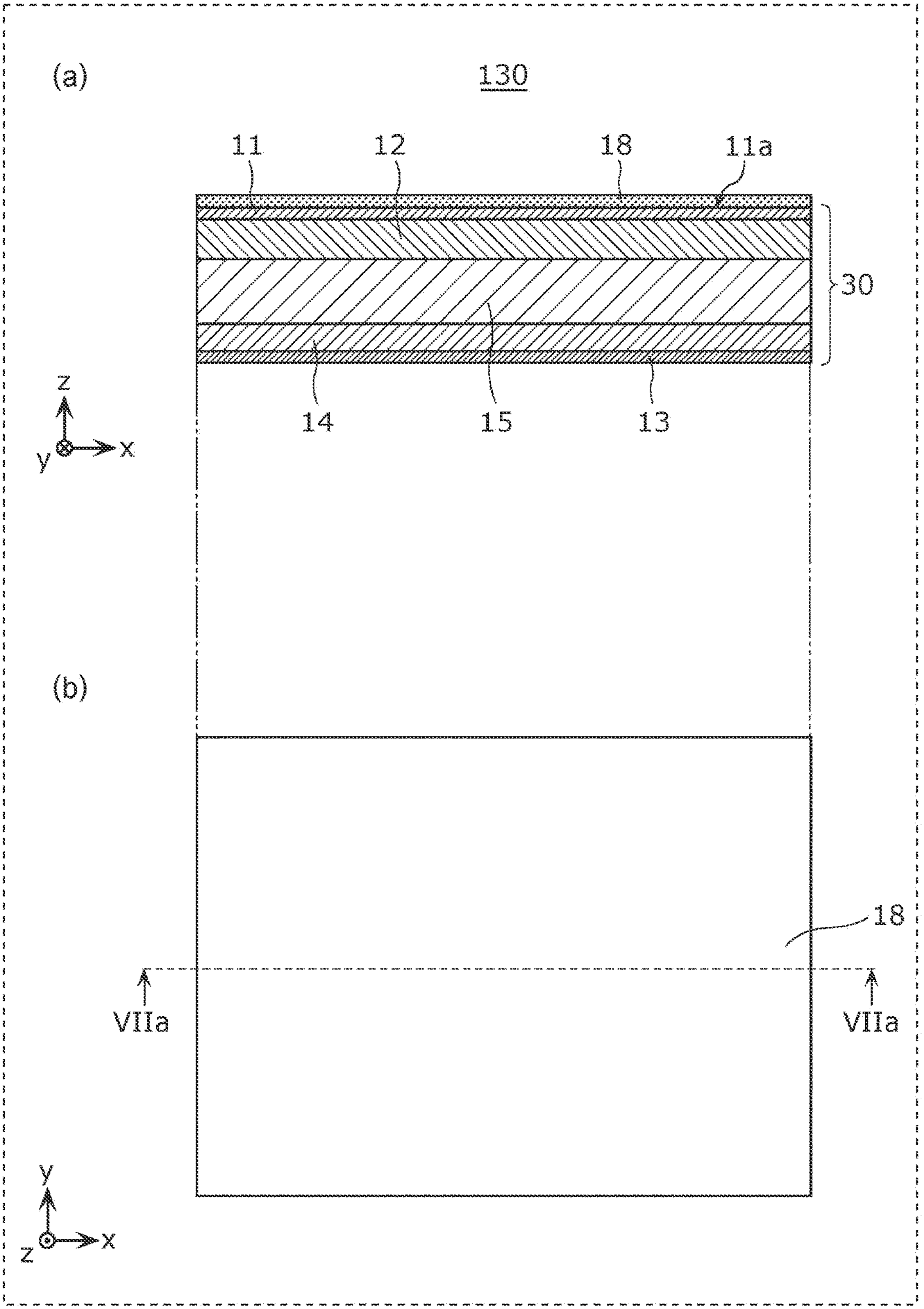
FIG. 7 shows a cross-sectional view and a plan view illustrating a schematic structure of a battery according to modification 3 of the embodiment.

FIG. 7 shows a cross-sectional view and a plan view illustrating a schematic structure of a battery according to modification 3 of the embodiment. Specifically, FIG. 7(*a*) is a cross-sectional view of the battery 130 according to the present embodiment, and FIG. 7(*b*) is a plan view when the battery 130 is viewed from above in the z axis direction. The cross section shown in FIG. 7(*a*) is a section at a position indicated by line VIIa-VIIa in FIG. 7(*b*).

As shown in FIG. 7, the battery 130 according to modification 3 of the embodiment differs from the battery 100 in the embodiment in that the plate-shaped member 18 composed of the first material is in contact with and integrated with the positive electrode current collector 11. A plurality of adhering objects 16 adhere to the main surface 11*a* of the positive electrode current collector 11, as in the embodiment. However, in FIG. 7, the illustration of the plurality of adhering objects 16 is omitted because they are small. In the present modification also, the features of the plurality of adhering objects 16 are the same as those in the embodiment.

In the structure of the battery 130, the plate-shaped member 18 is not peeled off and remains as part of the current collector. Specifically, the battery 130 includes, in addition to the structure of the battery 100, the plate-shaped member 18 in contact with the main surface 11*a* of the positive electrode current collector 11 that is on the opposite side from the positive electrode active material layer 12. The battery 130 is, for example, a battery produced without the peeling step in the method for producing the battery 100 described above. In the present modification, the first material included in the plate-shaped member 18 is an electrically conductive material such as a metal. As described above, the first material may contain the second metal as a main component or may be composed of the second metal.

As described using FIG. 4C in the description of the method for producing the battery 100 in the embodiment described above, the plurality of adhering objects 16 derived from the plate-shaped member 18 are biting into the main surface 11*a* of the positive electrode current collector 11 at the joint interface between the positive electrode current collector 11 and the plate-shaped member 18. Cracks 19 due to the pressure during pressing are formed in the positive electrode current collector 11 and the plate-shaped member 18. Since these cracks 19 are formed, stress in the plate-shaped member 18 and the positive electrode current collector 11 generated by a change in temperature or tension is absorbed.

With the above structure also, the battery 130 obtained has high reliability, and its deformation such as warpage can be reduced. The plate-shaped member 18 functions as a support for the soft positive electrode current collector 11 during processing such as the cutting step, and the effect of reducing the occurrence of cracking and a short circuit during handling can also be obtained.

[Modification 4]

Modification 4 of the embodiment will next be described. In the following description of modification 4, differences from the embodiment and modifications 1 to 3 of the embodiment will be mainly described, and the description of common features will be omitted or simplified.

Figure 8:
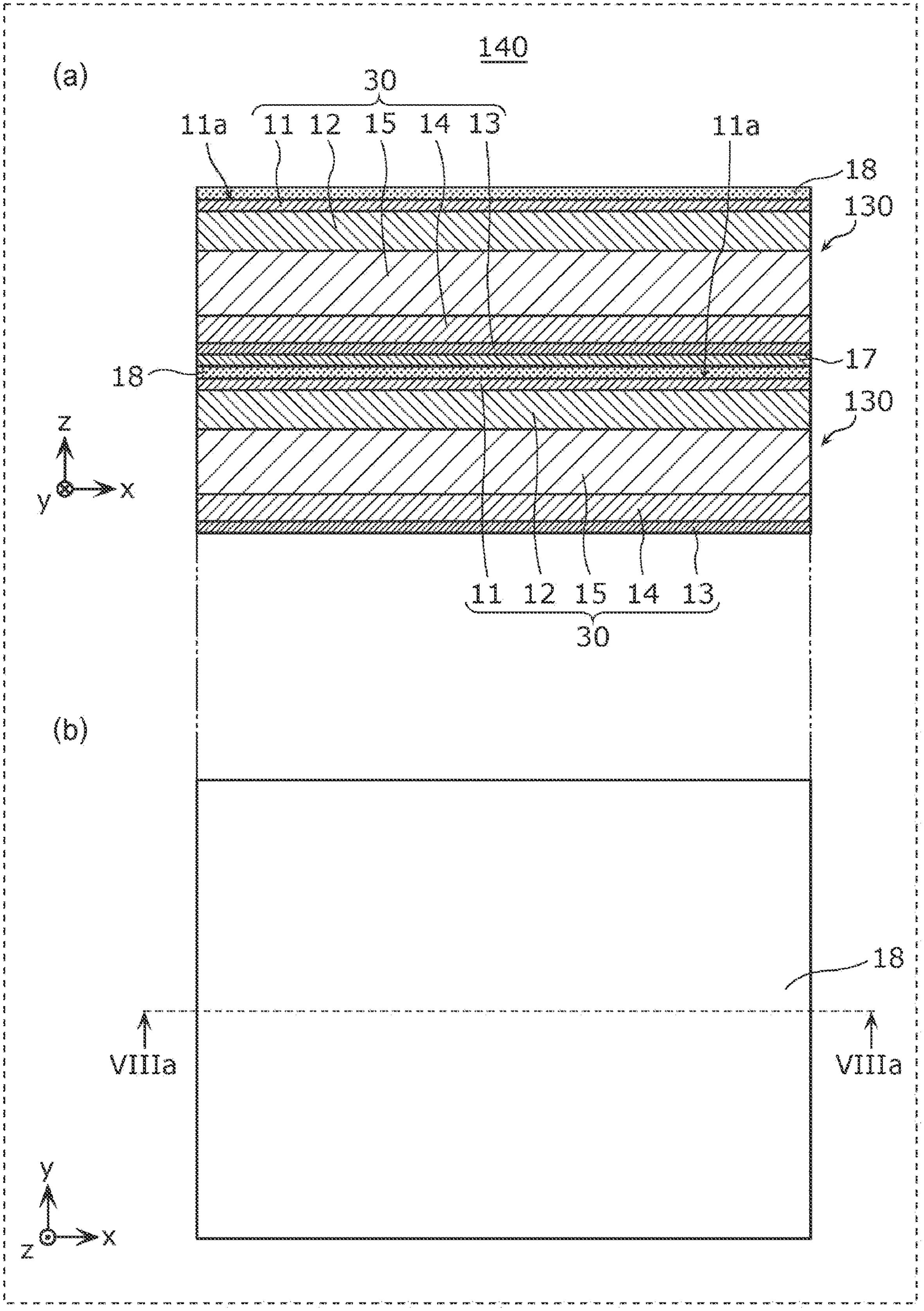
FIG. 8 shows a cross-sectional view and a plan view illustrating a schematic structure of a battery according to modification 4 of the embodiment.

FIG. 8 shows a cross-sectional view and a plan view illustrating a schematic structure of a battery according to modification 4 of the embodiment. Specifically, FIG. 8(*a*) is a cross-sectional view of the battery 140 according to the present embodiment, and FIG. 8(*b*) is a plan view when the battery 140 is viewed from above in the z axis direction. The cross section shown in FIG. 8(*a*) is a section at a position indicated by line VIIIa-VIIIa in FIG. 8(*b*).

As shown in FIG. 8, the battery 140 according to modification 4 differs from the battery 130 in modification 3 in that the electric power generating element 30 is not a single battery but is a battery including a plurality of the batteries 130 serving as single batteries and connected vertically in series. A plurality of adhering objects 16 adhere to the main surface 11*a* of each positive electrode current collector 11, as in the embodiment. However, in FIG. 8, the illustration of the plurality of adhering objects 16 is omitted because they are small. In the present modification also, the features of the plurality of adhering objects 16 are the same as those in the embodiment.

The battery 140 includes the plurality of batteries 130 and an electrically conductive connection layer 17 located between adjacent batteries 130 of the plurality of batteries 130. The battery 140 has a structure including the plurality of batteries 130 laminated together. The plurality of batteries 130 are laminated such that their vertical orientations are the same. The battery 140 is formed as a series connection laminated battery that includes the plurality of the batteries 130 in modification 3 and has the same arrangement and connection as those in modification 1. Specifically, in batteries 130 vertically adjacent to each other, the surface of the plate-shaped member 18 on the positive electrode current collector 11 of the lower battery 130 is electrically connected and fixed to the main surface of the negative electrode current collector 13 of the upper battery 130 with a connection layer 17 therebetween.

With the above structure also, the laminated battery 140 obtained is a high-voltage high-energy battery, and its deformation such as warpage can be reduced.

The plurality of batteries 130 may be laminated as a laminated battery in which the batteries 130 are connected in parallel using the same arrangement and connection as those in modification 2.

[Modification 5]

Modification 5 of the embodiment will next be described. In the following description of modification 5, differences from the embodiment and modifications 1 to 4 of the embodiment will be mainly described, and the description of common features will be omitted or simplified.

Figure 9:
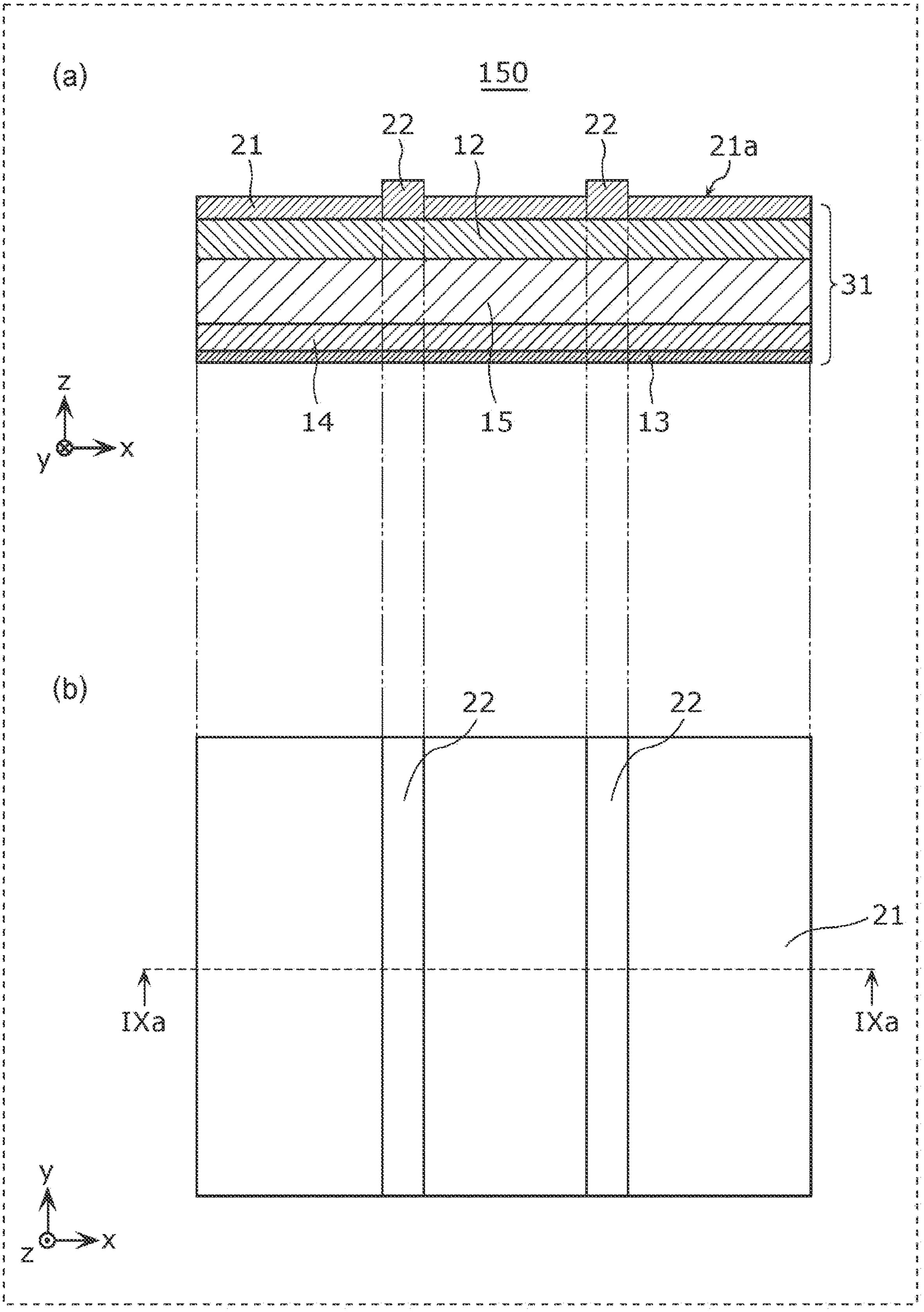
FIG. 9 shows a cross-sectional view and a plan view illustrating a schematic structure of a battery according to modification 5 of the embodiment.

FIG. 9 shows a cross-sectional view and a plan view illustrating a schematic structure of a battery according to modification 5 of the embodiment. Specifically, FIG. 9(*a*) is a cross-sectional view of the battery 150 according to the present embodiment, and FIG. 9(*b*) is a plan view when the battery 150 is viewed from above in the z axis direction. The cross section shown in FIG. 9(*a*) is a section at a position indicated by line IXa-IXa in FIG. 9(*b*).

As shown in FIG. 9, the battery 150 according to modification 5 of the embodiment differs from the battery 100 in the embodiment in that the battery 150 includes an electric power generating element 31 including a positive electrode current collector 21 having step portions 22 instead of the electric power generating element 30 including the positive electrode current collector 11.

Adhering objects 16 similar to those in the embodiment adhere to a main surface 21*a* of the positive electrode current collector 21 that is on an opposite side from the positive electrode active material layer 12. In FIG. 9, the illustration of the plurality of adhering objects 16 is omitted because they are small. In the present modification also, the features of the plurality of adhering objects 16 are the same as those in the embodiment.

The positive electrode current collector 21 includes the step portions 22 that are formed as protruding portions having a line shape in plan view, and the protruding portions have a width larger than or equal to 1 mm. The step portions 22 may be formed as recessed portions. In the present specification, the protruding portions have a shape protruding from a flat surface of the current corrector, and the recessed portions have a shape recessed from the flat surface of the current corrector.

The step portions 22 are formed on the main surface 21*a* of the positive electrode current collector 21 that is on the opposite side from the positive electrode active material layer 12. The step portions 22 are local step portions formed on the flat surface of the positive electrode current collector 21. In FIG. 9, two step portions 22 are formed in the short-side direction of the positive electrode current collector 21 so as to trisect the positive electrode current collector 21 in the long-side direction. No particular limitation is imposed on the extending direction of the step portions 22. Edge portions of the step portions 22 are formed so as to extend to the outer circumference of the positive electrode current collector 21 in plan view. Specifically, the edge portions of the step portions 22 in the short-side direction coincide with the outer circumference of the positive electrode current collector 21 in plan view. The outer circumference of the positive electrode current collector 21 is a portion serving as the outline of the positive electrode current collector 21 in plan view. The two step portions 22 are formed so as to be point symmetric with respect to the center point of the positive electrode current collector 21 in plan view.

The positive electrode current collector 21 has the step portions 22. Therefore, when a layer in contact with the surface of the positive electrode current collector 21 on which the step portions 22 are formed starts sliding, the sliding layer does not easily slide because stress is applied to the sliding layer by the step portions 22. Thus, the positional displacement between the positive electrode current collector 21 and the layer in contact with the surface of the positive electrode current collector 21 on which the step portions 22 are formed is reduced. For example, when another battery is laminated on the positive electrode current collector 21 with a connection layer 17 interposed therebetween, as in modifications 1 and 2 of the embodiment, the positional displacement of the laminated battery due to sliding is reduced. Moreover, when stress such as curing stress is generated in the layer in contact with the surface of the positive electrode current collector 21 on which the step portions 22 are formed, since the flat surface of the positive electrode current collector 21 is divided by the step portions 22, the stress is dispersed in the divided flat surfaces, so that the stress is relaxed. This reduces the deformation such as warpage of the battery 150. Therefore, the positive electrode current collector 21 and the connection layer 17 are prevented from being separated from each other or being deformed. This allows a large number of large thin layer batteries to be easily layered.

The width (the length in a direction orthogonal to the extending direction of the step portions 22) of the protruding or recessed step portions 22 formed as the protruding or recessed portions in plan view is larger than or equal to 1 mm. In the following description, the width of the protruding or recessed portions may be referred to simply as "width." The step height of the protruding or recessed portions may be referred to simply as "height." In the present specification, the step depth when the step portions have a recessed shape is also represented as "height." Specifically, the height is the length of the protruding or recessed portions from the flat surface of the positive electrode current collector 21 in the laminating direction.

The width of the step portions 22 may be larger than or equal to 2 mm or may be larger than or equal to 4 mm. When the step portions 22 are formed in the short-side direction of the battery 150, the width of the step portions 22 may be more than or equal to 1% of the length of the battery 150 in the long-side direction or may be more than or equal to 3%. No particular limitation is imposed on the upper limit of the width of the step portions 22. However, the width is, for example, shorter than or equal to 15 mm or less than or equal to 10% of the length of the battery 150 in the long-side direction. The height of the step portions 22 is, for example, larger than or equal to 2 μm or is larger than or equal to 6 μm. The height of the step portions 22 may be more than or equal to 1% of the thickness of the battery 150 or may be more than or equal to 3%.

Each step portion 22 is a step portion vertically extending upward and then vertically extending downward. Each step portion 22 may be a step portion obliquely extending upward and then obliquely extending downward. Each step portion may be a step portion having a curved portion extending upward and a curved portion extending downward.

As described above, the edge portions of the step portions 22 are formed so as to extend to the outer circumference of the positive electrode current collector 21 in plan view. Specifically, at least one of the edge portions of each step portion 22 is disposed so as so coincide with the outer circumference of the positive electrode current collector 21. In this case, the at least one edge portion of the each step portion 22 is exposed at a side surface of the battery 150. Therefore, the step portions 22 function as air discharge passages when the positive electrode current collector 21 is joined to a layer in contact with the surface of the positive electrode current collector 21 on which the step portions 22 are formed, and the adhesion between the positive electrode current collector 21 and the layer in contact with the surface of the positive electrode current collector 21 on which the step portions 22 are formed is increased.

The two step portions 22 are formed on the upper surface of the positive electrode current collector 21. The number of step portions 22 is not limited to two and may be one or three or more. From the viewpoint of obtaining the effect of the step portions 22 and the ease of formation simultaneously, the number of step portions 22 may be three or less or may be three or two.

A plurality of step portions 22 may be formed so as to extend parallel to each other in plan view, as shown in FIG. 9. In this case, even when the plurality of step portions 22 are formed, the distance between adjacent step portions 22 is constant. Therefore, stress when stress such as curing stress is generated in the layer in contact with the surface of the positive electrode current collector 21 on which the step portions 22 are formed is uniformly relaxed in the extending direction of the step portions 22.

The plurality of step portions 22 may be formed so as not to intersect each other. In this case, air bubbles are unlikely to be formed at the joint interface between the positive electrode current collector 21 and the layer in contact with the surface of the positive electrode current collector 21 on which the step portions 22 are formed, so that air dischargeability is further improved.

When the plurality of step portions 22 are formed, the widths, heights, and formation directions of the step portions 22 may be the same, or the step portions 22 may differ in at least one of width, height, and formation direction.

Step portions may be formed also on the surface of the positive electrode current collector 21 that is in contact with the positive electrode active material layer 12. In this case, delamination at the interface between the positive electrode current collector 21 and the positive electrode active material layer 12 is prevented. For example, when protruding step portions 22 are formed on the upper surface of the positive electrode current collector 21, recessed step portions may be formed on the lower surface of the positive electrode current collector 21.

The battery 150 is produced, for example, by pressing the positive electrode current collector 21 using an elastic sheet 41 having a size that trisects the positive electrode current collector 21 in the long-side direction in the pressing step of the method for producing the battery 100 in the above embodiment. Specifically, the elastic sheet 41 is placed on the plate-shaped member 18 so as not to overlap portions in which the step portions 22 are to be formed, and then the plate-shaped member 18 is pressed. This procedure is repeated to thereby form the positive electrode current collector 21 with the step portions 22 formed thereon.

When the battery 150 is produced using the above production method, the number of adhering objects 16 adhering to the positive electrode current collector 21 per unit area of the main surface 21*a* of the positive electrode current collector 21 that is on the opposite side from the positive electrode active material layer 12 is, for example, larger in portions other than portions in which the step portions 22 are located than in the portions in which the step portions 22 are located. In this case, a large number of hard adhering objects 16 adhere to the thin portions of the positive electrode current collector 11 in which no step portions are formed, and therefore the adhering objects can effectively relax stress in the thin easily deformable portions of the positive electrode current collector 11.

Other Embodiments

The battery according to the present disclosure has been described based on the embodiment, but the present disclosure is not limited to the embodiment. Various modifications of the embodiment that are conceivable by those skilled in the art as well as other embodiments obtained by combining some of the components in the embodiment and the modifications are included in the scope of the present disclosure so long as they do not depart from the scope of the present disclosure.

For example, the batteries in modifications 1, 2, and 4 of the embodiment are series or parallel connection laminated batteries. However, a series connection laminated battery and a parallel connection laminated battery may be combined to form a laminated battery.

For example, in the pressing step in the above embodiment, the plate-shaped member is placed on the electric power generating element to press the electric power generating element, but this is not a limitation. In the pressing step, the electric power generating element may be placed on the plate-shaped member to press the electric power generating element. In this case, the electric power generating element is placed such that the main surface of the positive electrode current collector is in contact with the roughened surface of the plate-shaped member.

For example, in the above embodiment and the modifications, the first material included in the plate-shaped member contains a metal, but this is not a limitation. It is only necessary that the first material be a material harder than the first metal, and the first material may be, for example, an inorganic material such as a ceramic or a metal oxide.

For example, in the above embodiment and the modifications, the electric power generating element includes the positive electrode current collector, the positive electrode active material layer, the solid electrolyte layer, the negative electrode active material layer, and the negative electrode current collector, but this is not a limitation. For example, a connection layer for reducing electric resistance and improving joint strength while the battery characteristics are maintained may be disposed between layers of the electric power generating element.

For example, in the above embodiment and the modifications, the plurality of adhering objects adhere to the positive electrode current collector, but this is not a limitation. When the negative electrode current collector contains the first metal and the positive electrode current collector contains the second metal harder than the first metal, a plurality of adhering objects may adhere to the negative electrode current collector. Therefore, it is only necessary that one of a combination of the positive electrode active material layer and the positive electrode current collector and a combination of the negative electrode active material layer and the negative electrode current collector be a combination of the first active material layer and the first current collector and the other be a combination of the second active material layer and the second current collector.

Various modifications, replacements, additions, omissions, etc. may be made to the above embodiment and the modifications within the scope of the claims or equivalents thereof.

The battery according to the present disclosure can be used, for example, as a secondary battery such as an all-solid-state battery used for various electronic devices, automobiles, etc.

What is claimed is:

1. A battery, comprising:

an electric power generating element including a first current collector containing a first metal, a first active material layer, a solid electrolyte layer, a second active material layer, and a second current collector containing a second metal harder than the first metal which are laminated in this order; and a plurality of adhering objects that are composed of a first material harder than the first metal and adhere to a main surface of the first current collector that is on an opposite side from the first active material layer, wherein a part of each of the plurality of adhering objects is embedded in the first current collector.

2. The battery according to claim 1, wherein the plurality of adhering objects have an average maximum width less than or equal to 10 μm in plan view.

3. The battery according to claim 1, wherein the first material contains the second metal.

4. The battery according to claim 1, wherein the main surface of the first current collector to which the plurality of adhering objects adhere is rougher than a main surface of the second current collector that is on an opposite side from the second active material layer.

5. The battery according to claim 1, wherein the first metal is aluminum, and wherein the second metal is copper.

6. The battery according to claim 1, wherein at least one of the plurality of adhering objects adheres to an edge portion of the first current collector in plan view.

7. The battery according to claim 1, wherein the first current collector includes at least one step portion formed as a protruding portion or a recessed portion and having a line shape in plan view, and wherein the protruding portion or the recessed portion has a width larger than or equal to 1 mm.

8. The battery according to claim 7, wherein the step portion is formed as the protruding portion, and wherein a number of the plurality of adhering objects adhering to the first current collector per unit area of the main surface of the first current collector that is on the opposite side from the first active material layer is larger in a portion other than a portion in which the step portion is located than in the portion in which the step portion is located.

9. The battery according to claim 1, wherein the solid electrolyte layer contains a solid electrolyte having lithium-ion conductivity.

* * * * *